(12) United States Patent
McClure

(10) Patent No.: US 12,158,172 B2
(45) Date of Patent: Dec. 3, 2024

(54) FASTENER ASSEMBLY AND METHOD FOR OPERATION OF SAID ASSEMBLY

(71) Applicant: Centrix AeroSpace LLC, Kent, WA (US)

(72) Inventor: Travis McClure, Kirkland, WA (US)

(73) Assignee: CENTRIX AEROSPACE LLC, Kent, WA (US)

( * ) Notice: Subject to any disclaimer, the term of this patent is extended or adjusted under 35 U.S.C. 154(b) by 427 days.

(21) Appl. No.: 17/143,988

(22) Filed: Jan. 7, 2021

(65) Prior Publication Data

US 2021/0207639 A1 Jul. 8, 2021

Related U.S. Application Data

(60) Provisional application No. 62/958,181, filed on Jan. 7, 2020, provisional application No. 62/958,165, filed on Jan. 7, 2020.

(51) Int. Cl.
| | | |
|---|---|---|
| *F16B 19/10* | (2006.01) | |
| *F16B 13/08* | (2006.01) | |
| *F16B 33/00* | (2006.01) | |

(52) U.S. Cl.
CPC ........ *F16B 19/109* (2013.01); *F16B 13/0833* (2013.01); *F16B 33/002* (2013.01)

(58) Field of Classification Search
CPC ... F16B 19/109; F16B 13/0833; F16B 33/002
USPC ......... 411/21, 45, 46, 47, 48, 49, 50, 51, 52, 411/55, 347
See application file for complete search history.

(56) References Cited

U.S. PATENT DOCUMENTS

| | | | | |
|---|---|---|---|---|
| 4,403,734 A | * | 9/1983 | Gorman | F16B 13/0866 238/375 |
| 4,671,718 A | * | 6/1987 | Eakin | B21J 15/42 81/177.85 |
| 5,803,689 A | * | 9/1998 | Magnus | E21B 41/0007 411/21 |
| 8,132,435 B2 | * | 3/2012 | Thomas | E05B 67/36 411/21 |
| 9,033,632 B2 | * | 5/2015 | Komsitsky | F16B 5/0208 411/182 |

(Continued)

FOREIGN PATENT DOCUMENTS

| | | | | |
|---|---|---|---|---|
| EP | 0198105 A1 | | 10/1986 | |
| FR | 3002992 A1 | * | 9/2014 | ........... B25B 31/005 |

(Continued)

OTHER PUBLICATIONS

European Patent Office, Extended European Search Report Issued in Application No. 20217360.5, May 11, 2021, Germany, 5 pages.

*Primary Examiner* — Eugene G Byrd
*Assistant Examiner* — Jock Wong
(74) *Attorney, Agent, or Firm* — McCoy Russell LLP

(57) ABSTRACT

A fastener assembly is provided. The fastener assembly comprises, in one example, a sleeve in an enclosure, the sleeve including an interior threaded section and a sleeve opening with a periphery forming a closed shape. The fastener additionally includes a collet body at least partially enclosed within the sleeve, the collet body comprises at least one flexible leg including a foot mating with the sleeve opening, where the sleeve opening extends around the foot and a stud including a threaded section engaging the interior threaded section.

14 Claims, 15 Drawing Sheets

(56) References Cited

U.S. PATENT DOCUMENTS

| | | | | |
|---|---|---|---|---|
| 9,115,744 | B1* | 8/2015 | Bulow | F16B 19/1036 |
| 2006/0024143 | A1* | 2/2006 | Wei | F16B 19/109 |
| | | | | 411/21 |
| 2011/0088242 | A1* | 4/2011 | Luneau | B25B 31/005 |
| | | | | 29/525.01 |
| 2011/0155878 | A1* | 6/2011 | Chen | F16B 19/109 |
| | | | | 248/225.21 |
| 2013/0039716 | A1* | 2/2013 | McClure | F16B 33/002 |
| | | | | 411/80.1 |
| 2013/0084130 | A1* | 4/2013 | McClure | F16B 5/06 |
| | | | | 403/327 |
| 2013/0156525 | A1* | 6/2013 | Gill | F16B 13/0858 |
| | | | | 411/32 |
| 2014/0056668 | A1* | 2/2014 | Demmeler | F16B 19/109 |
| | | | | 411/353 |
| 2016/0363146 | A1* | 12/2016 | Branyon, III | F16B 19/109 |
| 2017/0248163 | A1* | 8/2017 | McClure | F16B 19/1081 |
| 2017/0268552 | A1* | 9/2017 | McClure | F16B 13/063 |
| 2017/0314601 | A1* | 11/2017 | McClure | F16B 13/0833 |
| 2018/0017094 | A1* | 1/2018 | Lopez | F16B 2/04 |
| 2018/0021860 | A1* | 1/2018 | Craig | F16B 19/109 |
| | | | | 408/103 |
| 2019/0078600 | A1 | 3/2019 | McClure | |
| 2021/0062847 | A1 | 3/2021 | McClure | |

FOREIGN PATENT DOCUMENTS

| | | | | | |
|---|---|---|---|---|---|
| FR | 3019078 | A1 | | 10/2015 | |
| FR | 3022961 | A1 | * | 1/2016 | B25B 31/005 |
| GB | 2552524 | A | * | 1/2018 | F16B 19/109 |
| JP | H068084 | A | * | 1/1994 | |

* cited by examiner

FASTENER ASSEMBLY AND METHOD FOR OPERATION OF SAID ASSEMBLY

CROSS REFERENCE TO RELATED APPLICATIONS

The present application claims priority to U.S. Provisional Application No. 62/958,181, entitled "FASTENER ASSEMBLY AND METHOD FOR OPERATION OF SAID ASSEMBLY" filed on Jan. 7, 2020; and U.S. Provisional Application No. 62/958,165, entitled "FASTENER AND METHOD FOR OPERATION OF SAID FASTENER" filed on Jan. 7, 2020. The entire contents of the above-referenced applications are hereby incorporated by reference in their entirety for all purposes.

FIELD

The present description relates generally to a fastener assembly designed to clamp workpieces.

BACKGROUND AND SUMMARY

Many manufacturing fields use fasteners, such as blind fasteners, for securing two objects to one another when only one side of a joint is accessible. Styles of blind fasteners having splitter bars that drive expansion of the clamping legs have been utilized in various industries to allow for rapid workpiece clamping/unclamping. The splitter bars in previous fasteners are machined as a single piece and interact with machined or formed legs during clamping/unclamping action. In this style of fastener (e.g., cleko style fasteners), the clamping legs interact with the splitter bar to axially expand the legs during clamping and the legs axial retract when sufficiently extended past the splitter bar when unclamping the fastener. These fasteners are used in the aerospace industry and other manufacturing applications (e.g., automotive manufacturing) to temporarily secure metal structures in place. Other blind fastener designs include studs threading into collet bodies with clamping sections radially expanded by the stud. When expanded, the sections slide under a lower workpiece and act as a lower clamping arm, while a surface in the head of the stud acts as an upper clamping arm that engages an upper workpiece.

The inventor has recognized several drawbacks with previous splitter bar style fasteners. For instance, the fastener's clamping legs may be susceptible to degradation during fastener clamping. For example, the clamping legs may be adjacent to workpiece apertures during clamping. Consequently, the legs may experience unwanted loading if the workpieces shift positions. The clamping legs, however, may be ill equipped to carry the unwanted loading and the certain types of stresses, such as shear and bending stresses, that these loads create. For instance, in previous fasteners each leg acts as an independent element when experiencing shear and bending stresses. To elaborate, each of the independent legs can slide back and forth when the fastener is in use. As such, the legs do not cooperatively interact when experiencing shear and bending forces and therefore are not able to withstand these loads when they occur in certain operating environments. The clamping legs, therefore, may become damaged and/or may be difficult to remove in certain circumstances. Furthermore, the clamping legs may be susceptible to damage during insertion and removal of the fastener. For example, the clamping legs may become hung-up on workpiece openings, increasing fastener insertion and removal difficulty as well as potentially causing abrasive wear to the legs and/or workpiece.

In other blind fasteners, during certain conditions, the lower sections of the collet body legs may remain bent inward when a stud pushes upper portions of the legs open. The fastener will therefore remain disengaged where fastener engagement is anticipated. The fastener may be threaded further into the collet body to force the feet outward, in an attempt to address the foot disengagement problem. However, threading the fastener further into the collet to initiate fastener engagement can damage the fastener's legs. The fastener's reusability is resultantly decreased. Legs remaining bent inward even when sections of the legs are urged outward may also decrease the collet's structural integrity. In other prior fasteners undesirable workpiece shifting may occur. To elaborate, as the legs in the fastener close and transition to a disengaged position, they may form a tapered or conical shape thus creating a gap in which the lower workpiece (e.g., plate, panel, etc., in an airplane or other system, machine, etc., where clamping is desired) can laterally shift in a direction perpendicular to the longitudinal axis of the collet. Additionally, legs in prior fasteners may be unable to carry shear loading in certain installation environments.

Facing the aforementioned challenges, the inventor developed a fastener to at least partially resolve some of the issues. In one example, a fastener is provided that comprises a sleeve including an interior threaded section and a sleeve opening (e.g., "window") with a periphery forming a closed shape and a collet body at least partially enclosed within the sleeve. In one example, the collet body may comprise a crown and a flexible leg extending from the crown and including a foot mating with the sleeve opening, where the sleeve opening extends around the foot and where the crown is positioned axially offset (e.g., above or below) the sleeve opening. However, in other examples, the collet legs may be manufactured independently from each other (i.e., no shared crown) and have an extension configured to allow the legs clamping feet to rotate towards and away from the centerline of the fastener, similar to a hinge at the top of the leg. In this way, the legs may have less accumulated stress and enables for a wide variety of material construction options for the legs.

The fastener may further include, in one example, a stud having a threaded section engaging the interior threaded section of the sleeve. By positioning the interface between the foot and sleeve opening above the collet crown, the foot is first engaged by the stud during fastener clamping. Consequently, a condition where the foot is bent inward when the feet are thought to be engaged is circumvented, thereby increasing fastener reliability. Additionally, by partially enclosing the collet within the sleeve a more uniform shape is allowed to interface with the workpieces, if desired, when compared to previous fasteners where the clamping legs forming a tapered or conical profile and interface with the workpieces. As a result, the chance of the workpieces clamped by the fastener shifting during fastener insertion or removal is reduced.

In another example, the fastener may include a plurality of independent flexible legs that each include a first axial end and a second axial end with a foot at the first axial end. In this example, each of the feet mate with one of the sleeve openings and the second axial ends of the legs are spaced away (e.g., distally or proximally spaced away) from the sleeve openings. This configuration allows the legs to be designed with larger clamping feet, if desired, thereby increasing the structural integrity of the feet.

In another example, to at least partially overcome the aforementioned challenges, the inventor developed a fastener assembly to at least partially overcome at least a portion of the challenges. In one example, the fastener assembly includes a clamping unit having two clamping legs. Each leg has a shank and a clamping foot that extends therefrom and a splitter bar that includes extensions and a shaft that extends between the two clamping legs. The splitter bar radially expands the clamping legs during clamping and the legs axial retract when sufficiently extended past the splitter bar when unclamping the unit and retracts the clamping feet responsive to axially translation of the clamping unit. The fastener assembly further includes a protective sleeve partially circumferentially surrounding at least a portion of the clamping leg shanks and the splitter bar. The protective sleeve comprises slots having the extensions extending there through. In some instances, the sleeve may include two slots with two extensions of the splitter bar extending there through. Further, in one example, the splitter bar may include two anchors at either end that extend across the slots. However, embodiments with other combinations of slots, extensions, and/or anchors, have been envisioned. The protective sleeve increases the fastener's structural integrity (e.g., significantly increases the fastener's ability to carry shear and bending loads), thereby increasing the durability of the fastener. To elaborate, the sleeve works in unison with other components in the fastener to increase the amount of bending and shear stresses that can be carried by the fastener during use. Additionally, the protective sleeve guards the legs and splitter bar from damage during fastener insertion and removal. For instance, the sleeve reduces the likelihood of the fastener's clamping legs hanging up on workpiece openings during fastener insertion and removal because the sleeve reduces the chance (e.g., prevents) that the legs will bend outward beyond a desired threshold. The protective sleeve also increases fastener alignment during insertion and removal of the fastener.

In one example, the protective sleeve may further include a first reinforcement section that extends across an upper end of each of the slots and a second reinforcement section that extends across a lower end of each of the slots. The reinforcement sections further increase the fastener's ability to manage shear and bending stresses to further increase fastener durability.

In another example, an axial length of the splitter bar is less than an axial length of the slots of the protective sleeve. In this way, the splitter bar may be efficiently mated with the protective sleeve during fastener assembly. For example, the splitter bar may be slid through the slots into a gap between the clamping legs during fastener assembly.

In yet another example, when the fastener assembly is transitioned from the unclamped configuration to the clamping configuration, the slots in the sleeve axially translate with regard to the two extensions in the splitter bar. Consequently, the protective sleeve shifts to accommodate for movement of the clamping unit during workpiece clamping, resulting in increased clamping unit protection.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-10, 12-22, 24-27, and 29 are drawn approximately to scale. However, other relative dimensions may be used, in other embodiments.

DETAILED DESCRIPTION

Figure 1:
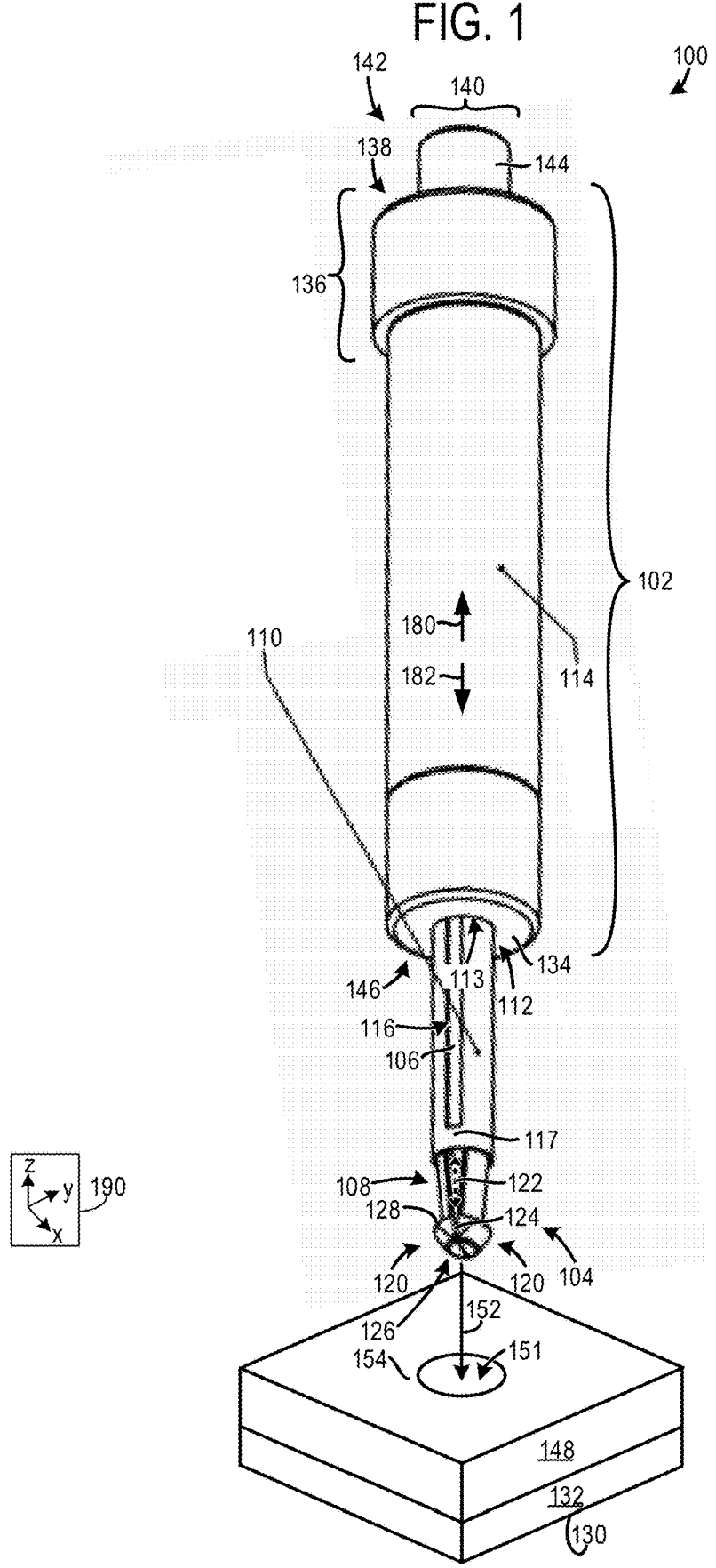
FIG. 1 shows an assembled view of a fastener assembly.

Previous splitter bar style fasteners have not been able to manage elevated stresses in certain installation scenarios. To elaborate, legs, splitter bars, and other components in previous splitter bar style fasteners are not designed to cooperatively interact to increase the fastener's structural integrity. For example, each component may flex during use and does not reinforce adjacent components by a desired amount. Designing the fastener's components in this manner therefore significantly impacts the fastener's ability to carry shear and bending loads. Consequently, previous splitter bar style fasteners may not be able to meet structural design goals in certain end-use environments. A useful analogy highlighting the drawbacks of previous fastener designs may be to picture the legs of a splitter bar style fastener (e.g., a cleko fastener) as stacked pages in a paperback book. Imagine grabbing the book by the binding in one hand, and the opposite edge of the book in the other hand, and then try to pull your hands apart in a planar motion. This is equivalent to tension loading or axial loading, in this example. In tension, the pages each carry a small part of the total tensile forces, thus acting together to react the total tensile loading. In traditional spreader bar fasteners, the legs work in a similar manner to the individual pages to each carry a part of the total tensile force. In the paperback example, now grab the book in the exact same manner as before and move one hand towards your head and the other towards your feet—this simulates bending and shear loading. The book easily bends and deforms. Notice that the pages of the book have slid relative to each other. This is evident as the pages at the edge opposite the binding are not aligned in a straight manner that would be evident of the book was laying on a table. Again, previous splitter bar fasteners operate in the same manner. When presented with shear or bending, each leg has an unconstrained end that is independent of the other legs and thus free to slide along the length of the splitter bar. In doing so, they lose the ability to jointly resist the shear and/or bending forces. Therefore, these previous splitter bar type fasteners lose valuable structural integrity when subject to shear and/or bending forces and as such are not well equipped to resist shear and/or bending loads.

The following description relates to a fastener assembly with a protective sleeve. The sleeve guards clamping legs against degradation during tooling and increases the fastener's ability to carry increased loads and the shear and bending stresses that the loads create. The sleeve circumferentially surrounds clamping legs and a splitter bar causing leg actuation during clamp-up. In this way, the internal components are protected from abrasive wear during removal/insertion of the fastener to/from workpieces. The sleeve further protects components from external loading when the fastener is clamped. The sleeve, legs, and splitter bar may be retained in a cavity of a body at their upper ends by way of a lip at the body's upper end. The fastener may further include a drive mechanism which generates axially translation of the clamping legs during clamping/unclamping action. During fastener clamping, the drive mechanism (e.g., external drive nut) draws the clamping legs up into the body while the splitter bar remains substantially stationary. The splitter bar pushes the legs radially outward. When radially expanded, the feet of the clamping legs act as a lower clamping surface and a face of the body acts as an upper clamping surface when the fastener is clamping workpieces. As the clamping legs are drawn up into the body, the sleeve shields the clamping legs, thereby protecting the legs from abrasive wear. During fastener clamping operation, the sleeve allows unwanted workpiece loading (e.g., shear loading) to be transferred away (e.g., substantially decoupled) from the clamping legs and diverted to a more robust component (i.e., the sleeve). To elaborate, the sleeve includes slots which allow portions of the splitter bar to extend there through. The sleeve may also have unslotted portions at either end. The unslotted portions allow the sleeve to act as a combined unit. Returning to the paperback example, the unslotted portions may be similar to the binding at one edge and then gluing all the page together at the opposite edge. Whether gluing the edges of a paperback, or simple leaving both ends of the sleeve unslotted, both result in the sleeve (e.g., book, in the paperback example) having increased structural integrity to resist shear and/or bending loads. When the sleeve element is deployed, the clamping legs are decoupled from shear and/or bending loads and thus may have their full capacity reserved for carrying tension (clamping) loads, one of the sleeves beneficial characteristics. In other words, the legs carry clamping loads while being substantially decoupled from shear and bending loading. In this way, the load path in the fastener is tuned to increase the fastener's resiliency, durability, etc. The sleeve also may serve to align the clamping feet in a more desirable orientation. The sleeve in the fastener also simplifies the removal of the fastener. For instance, the clamping stack may shift during use of the fastener. The sleeve reduces the shifting of the stack, reducing the likelihood (e.g., preventing) the clamping legs from becoming hung up on one of the workpiece that has shifted in the stack. Thus, the clamping feet may be less susceptible to shifting out of a desired angular alignment during clamping. Consequently, during clamping action the fastener may be less vulnerable to adverse effects of workpiece loading and increases the fastener's alignment. The aforementioned benefits work in conjunction to increase fastener reliability, allowing the fastener's lifespan to be increased. Furthermore, the diametrical tolerances of a one-piece sleeve may be held much tighter, if desired, than previous fasteners with three-piece splitter bar arrangements and can therefore provide better alignment across a variety of usage scenarios.

A fastener with reliable clamping leg actuation is further included in the following description. The fastener includes a collet body with flexible legs. The legs include feet mating with openings (e.g., windows) in a protective sleeve. The collet body may further include a crown, in one example. In such an example, the crown may be offset (e.g., positioned axially above or below) from the openings. In another embodiment a hollow bushing may be included in the fastener. The hollow bushing may be configured to increase the structural integrity of the protective sleeve after the legs (or collet body with legs) have been assembled into the fastener. In another embodiment where the crown is positioned below the openings, the hollow bushing may be configured to restrict the collet (or legs) end opposite the clamping legs from perpendicular movement with respect to the centerline of the fastener. The hollow bushing may allow the stud to pass through a center of the bushing in certain clamped configurations of the fastener such as when the stud is fully extended. However, when the crown is positioned above the openings, the stud may restrict the legs (opposite end from the clamping feet) from moving perpendicular to the fastener's central axis. In one example, the stud may be shaped to substantially prevent the feet of the legs from egress out of the opening when the fastener is in a disengaged configuration regardless of collet body (or individual legs) distal vs proximal orientation. In this embodiment, the clamping feet are prevented from being pushed too far towards the centerline of the fastener and thus disengaging from the windows. Initial engagement between the feet and the stud during a fastener's clamping phase eliminates the possibility of the collet legs remaining bent inward (e.g., disengaged) when the stud pushes sections of the legs outward. Consequently, the cost and complexity of the fastener can be decreased while increasing the fastener's reliability.

In another embodiment, the fastener may include discrete legs with clamping feet forming a collet body. During fastener assembly, each leg may be inserted into the sleeve sequentially. Forming the collet legs separately allows the size of the clamping feet to be increased, if desired. For example, when the collet body is formed as a cohesive unit, the size of the clamping feet may be delimited by the diameter of the sleeve's interior openings. To elaborate, when the collet is a continuous unit, the global diameter of the clamping feet, when converged, cannot exceed the inner diameter of the sleeve, to allow for the collet to be mated with the sleeve. However, when the clamping legs are individually formed and sequentially placed in the sleeve, the size of the feet can be increased. Thus, when the fastener includes discrete clamping legs the global diameter of the clamping feet may be equal to the sleeve's inner diameter but is not limited to the sleeve's inner diameter. In one example, the leg units may be installed feet first so that end of the leg units opposite the feet are axially below the sleeve openings. In another example, the leg units are installed so that the end of the leg unit opposite of the feet are installed axially above the sleeve openings. In this way, the legs may be efficiently installed in the sleeve.

A fastener assembly 100 (e.g., removable fastener assembly) is depicted in FIG. 1. The fastener assembly 100 includes a body 102 housing portions of a clamping unit 104, a splitter bar 106 positioned between clamping legs 108 in the clamping unit 104, and a protective sleeve 110. Thus, the body 102 at least partially circumferentially encloses portions of the clamping unit 104, splitter bar 106, and protective sleeve 110. To elaborate, a lip 112 at a first end (e.g., lower end) of the body 102 allows the clamping unit 104, splitter bar 106, and protective sleeve 110 to be axially retained in the body. In this way, the fastener may remain as a cohesive unit during insertion and removal of the fastener. As a result, the fastener's installation process is made more efficient and the chance of misplacing, loosing, etc., fastener parts is reduced. The body 102 may further include an opening 113 allowing a portion of the sleeve 110 to extend there through.

The fastener components are described herein with regard to upper and lower ends, sides, etc., to provide a recognizable descriptive framework. An upper end refers to an outer section with regard to a first axial direction 180 and a lower end refers to an outer section with regard to a second axial direction 182 opposing the first axial direction. However, it will be understood that the fastener may not be aligned with a gravitational axis, in certain circumstances. Thus, numerous angular alignments of the fastener during installation, clamping, etc., are possible.

The body 102 includes an outer surface 114. In the illustrated example, the outer surface 114 has a cylindrical shape. However, in other examples, at least a portion of the outer surface 114 may have another suitable shape such as a polygonal shape allowing the body to interface with a tooling device (e.g., wrench, driver bits, etc.).

The protective sleeve 110 includes two slots 116. "T" shaped extensions 118, shown in FIG. 2, extend through the slots 116 of the protective sleeve 110. Although the extensions 118 have a "T" style shape in the illustrated example, other suitable orientations and/or shapes of the extensions may be used, in other embodiments.

Continuing with FIG. 1, the protective sleeve 110 includes a lower reinforcement section 117 extending across lower ends of the slots 116. The lower reinforcement section 117 circumferentially surrounds a central axis 122 of the fastener assembly 100. The reinforcement section 117 increases the structural integrity of the sleeve and specifically increases the fastener's ability to withstand bending and shear loads when the fastener is in use. Consequently, the chance of fastener degradation caused by loading during use is decreased. To elaborate, the sleeve may allow bending and shear loading to be substantially decoupled from the clamping legs 108. Decoupling the bending and shear from the legs facilitates a free body state in which the legs carry clamping loads (e.g., carry only clamping loads), a desirable arrangement for this type of fastener. The protective sleeve may simplify removal of the fastener especially when one or more parts in the stack to be clamped have shifted, as the shifted members tend to shift as much as the legs allow and thus in previous fasteners the shifted workpieces come to rest on the leg and "hang up" on the clamping feet. The sleeve reduces the chance of (e.g., prevents) the clamping feet from becoming "hung-up" as the shifted part only shifts until it hits the sleeve which is a relatively small amount. Furthermore, the increased stiffness of the sleeve (when compared to previous fasteners) creates better alignment. Additionally, the diametrical tolerances of a single piece sleeve can be held much tighter than the traditional three-piece leg/splitter bar arrangements and can thus provide better alignment across a wide range of scenarios, if wanted.

Figure 2:
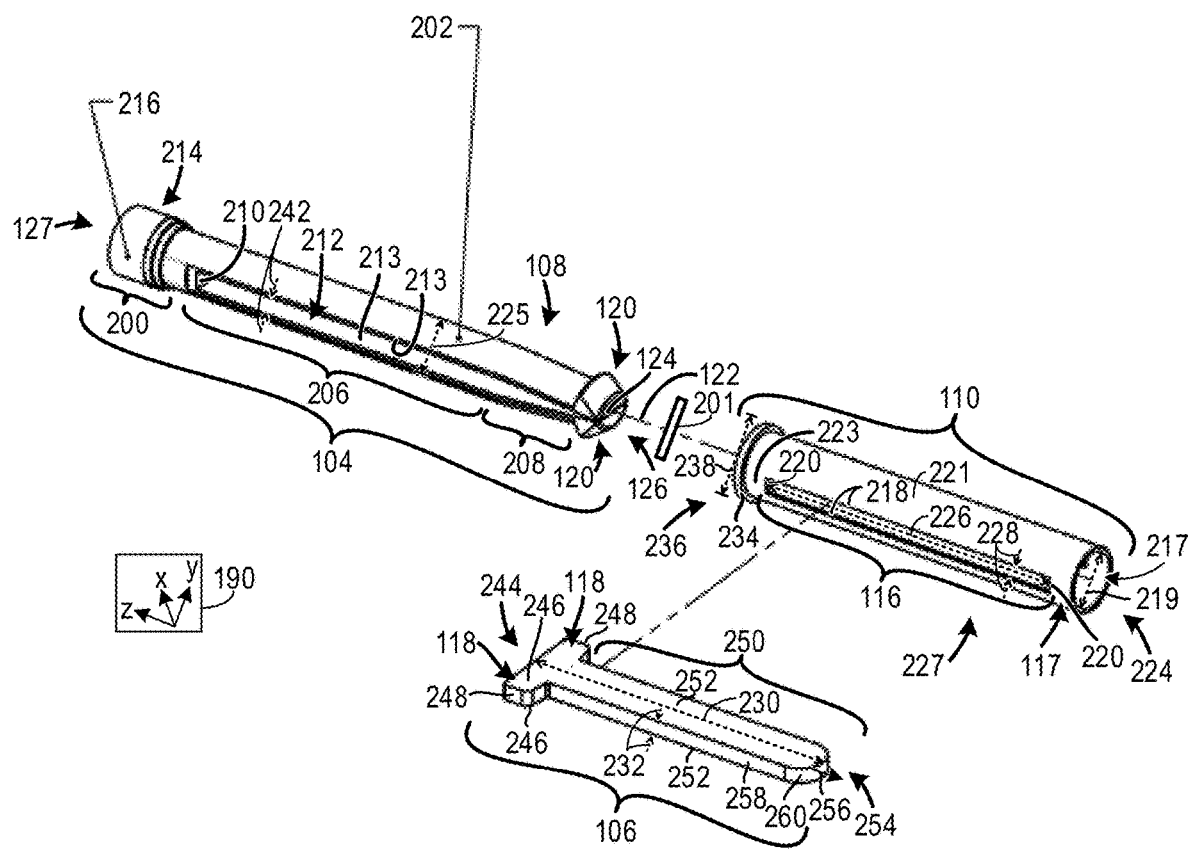
FIG. 2 shows an exploded view of a portion of the fastener assembly, illustrated in FIG. 1, including a protective sleeve, splitter bar, and clamping unit.

Additionally, in one example, the extensions 118, shown in FIG. 2, in the splitter bar 106 may be fixedly attached to an interior surface of the lip 112 or inside the body 102. In this way, the splitter bar may be held substantially stationary while the clamping unit is axially translated into a clamping configuration and an unclamped configuration. However, in other examples, the extensions 118 in the splitter bar 106 may be seated in recesses in the body and coupled (e.g., press fit, welded, etc.) to a side of the body 102.

The fastener assembly 100, depicted in FIG. 1, is in an unclamped configuration where clamping feet 120 in the clamping legs 108 extend inwardly toward the central axis 122 of the fastener. Specifically, in the illustrated example, interior surfaces 124 of the clamping feet 120 contact one another. However, other clamping feet positions in the unclamped configuration may be used, such as an arrangement where the interior surfaces are spaced apart.

It will be understood that the clamping legs 108 are flexible (e.g., resiliently deformable). The material used to form the legs as well as the profile of the legs may dictate the amount of flexion of the legs. For instance, the legs may have a radially converging profile (e.g., tapered profile) in a direction extending toward the lower end 126 of the clamping unit 104. However, numerous suitable leg profiles have been contemplated. The feet 120 include a clamping surface 128 that contact an outer surface 130 of a lower workpiece 132 when the fastener is in a clamping configuration. On the other hand, a face 134 of the body 102 functions as the upper clamping surface in the clamped configuration. Thus, when the fastener is in a clamping configuration the face 134 contacts the surface 154 in the upper workpiece 148. In the illustrated example, the face 134 is radially aligned. However, in other instances, the face 134 may have another suitable profile such as a tapered profile. In such an example, the workpiece aperture may be correspondingly shaped to allow the face to contact the upper workpiece.

The body 102 includes a cap 136 at an upper end 138. A drive mechanism 140 is positioned at the upper end 142 of the fastener assembly 100. The drive mechanism 140 functions to axially translate the clamping unit 104 when transitioning the fastener from the clamped configuration to the unclamped configuration or vice versa. The drive mechanism 140 may include a drive component 144 (e.g., drive nut) threading into the body 102. In such an example, the drive component 144 may include a tooling interface (e.g., polygonal head, polygonal recess, slotted recess, etc.) designed to mate or otherwise receive a tool designed to rotate the drive component 144 in two opposing rotational directions. It will be understood that rotation of the drive component 144 in the first rotational direction causes axial translation of a threaded rod coupled to the drive nut downward toward the lower end 146 of the body 102.

The threaded rod may be coupled to an internal nut element or nut cage of the clamping unit such that the clamping unit axial translates upward and downward responsive to axial movement of the rod. The nut cage is described in greater detail herein. Therefore, axial translation of the threaded rod toward the lower end 146 of the body 102 moves the clamping unit downward and therefore transitions the legs in the clamping unit into an unclamped configuration. On the other hand, rotation of the drive nut in the second rotation direction causes axial translation of the threaded rod upward away from the lower end 146 of the body 102. In turn, axial translation of the threaded rod moves the clamping unit 104 upward to place the clamping legs in the clamping configuration where they are radial expanded by the spreader bar.

The drive component 144 (e.g., drive nut) and top portion of the body 102 may have a cooperating axial load carrying features in order to support the clamping forces (for the drive nut to axially react loads with and act as an anchor in which to "pull" the legs up and over the stationary splitter bar). The fastener may further include a spring positioned in the body and contacting the clamping unit. In such an example, the spring is compressed when the fastener is transitioned into a clamped configuration. Thus, the spring urges the clamping unit back to an unclamped configuration.

Additionally, the drive component 144 (e.g., drive nut) and a top portion of the body 102 may be designed to cooperatively carry axial loads to support clamping forces. To elaborate, the drive nut and upper body portion are configured to axially react loads and act as an axial anchor to pull the legs up and over the splitter bar.

An upper workpiece 148 and the lower workpiece 132 each including an aperture 151 are shown in FIG. 1. It will be understood that the fastener assembly 100 may be inserted through the workpiece apertures 151 in the unclamped configuration, indicated via arrow 152. The upper workpiece 148 includes an outer surface 154 that is clamped via an upper clamping surface in the fastener, which is the face 134 of the body 102, in the illustrated example. On the other hand, the lower workpiece 132 includes the outer surface 130 that is clamped via a lower clamping surface 128 in the fastener. The clamping action in the fastener is described in greater detail herein.

The workpieces 132 and 148 may be included in a variety of components, systems, devices, etc., in a wide variety of fields (e.g., the aerospace industry, the construction industry, manufacturing industry, maritime industry, the automotive industry, etc.). The workpieces may be constructed out of a variety of suitable materials such as metal (e.g., steel, aluminum, titanium, etc.), composite materials, polymer materials, combinations thereof, etc. Additionally, the fastener may be constructed out of numerous suitable materials or combinations of materials such as metal (e.g., steel, aluminum, titanium, etc.), polymer materials, combinations thereof, etc. Moreover, the materials used to construct the different components in the fastener may be chosen based on end use requirements. It will be appreciated that for structural applications (e.g., large load bearing structures) the fastener may be constructed out of steel. On the other hand, when designed for commercial applications the fastener system may employ plastics. Further, in other examples, the fastener assembly may have a hybrid material construction where both plastic and metal are utilized.

An axis system 190 is shown in FIG. 1 as well as FIGS. 2-10, 12-27, and 29 to establish a common frame of reference. In one example, the z-axis may be parallel to a gravitational axis, the x-axis may be a lateral axis, and the y-axis may be a longitudinal axis. However, other orientations of the axes may be used, in other examples. Additionally, the central axis 122 is provided in FIGS. 1-5, when appropriate. Directions along the central axis may therefore be referred to as axial directions. It will also be understood that a radial direction refers to a direction extending from the central axis and arranged perpendicular to the central axis.

FIG. 2 shows an exploded view of the protective sleeve 110, the clamping unit 104, and the splitter bar 106. The clamping unit 104 may include a nut cage 200. In one example, the nut cage 200 comprises a threaded interior portion (e.g., similar to a nut) and an exterior polygonal portion (e.g., hexagonal, octagonal, square, etc.) The exterior polygonal portion functions as an anti-rotation feature that can axially translate within an interior portion (e.g., interior polygonal, hexagonal, etc., portion) of the body 102, shown in FIG. 1. The nut cage 200 may include a leg capturing structure. The leg capturing structure may allow each individual leg to be inexpensively stamped and then added to and trapped by the nut cage via a swaging and/or brazing operation, for instance. The nut cage therefore allows the clamping unit to axially translate within the body but rotation of the unit with regard to the body is substantially inhibited. The clamping unit 104 may include a leg capturing feature which allows the clamping legs to be stamped or otherwise manufactured (e.g., machined, cast, etc.) and then coupled (e.g., swaged, brazed, press fit, etc.) to the nut cage. The leg capturing features allows the legs to be inexpensively incorporated into the clamping unit, if desired. As such, the clamping legs 108 are joined near the upper end. In this way, the relative position of the legs at one end may be substantially retained.

When the fastener is assembled, the internal nut cage 200 and clamping unit 104 are coupled to one another. Subsequently, protective sleeve 110 is mated with the clamping unit 104 and then the splitter bar 106 is anchored to the body 102. Thus, the protective sleeve 110 is bounded on one side by the nut cage and on the other side by the "T" extensions of the splitter bar. When in use, the nut cage 200 is pulled up into the body 102 to open the clamping legs 108 via the splitter bar 106. Once the legs are opened, the clamping feet 120 extend beyond the sleeve to serve as a clamping arm. The clamping feet 120 may act to force the sleeve to axial move with the feet as they are axially pulled into the body. In one example, the protective sleeve 110 may remain substantially stationary when the clamping legs 108 are opened and then may travel with the clamping legs at the urging of the expanded clamping feet 120. However, in other examples, the flange 234 of the protective sleeve 110 may act as a landing for a compression spring, generically depicted at 201.

Figure 7:
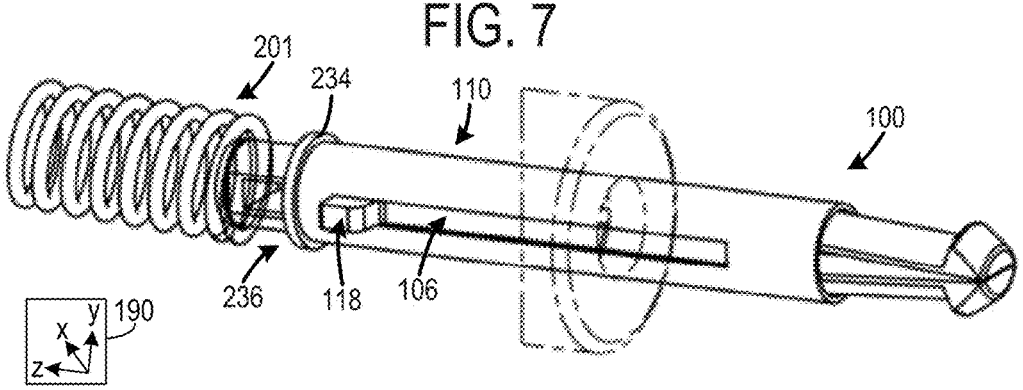
FIG. 7 shows a detailed view of the protective sleeve and an optional spring in the fastener assembly, shown in FIG. 1.

The spring is shown in greater detail in FIG. 7. As such, the compression spring may sit between the nut cage 200 and the outer diameter 238 of the flange 234 and may be sized to urge the protective sleeve 110 towards the "T" shaped extensions 118 of the splitter bar 106. In such an example, the compression spring may travel with the protective sleeve 110 when the expanded clamping feet 120 are in contact with an end of the protective sleeve during clamping operation and urge the sleeve to travel in tandem with the clamping feet. Additionally, in one embodiment, the flange 234 may also cooperate with the lip 112 of the body 102, shown in FIG. 1, to limit the axial motion in a direction opposite of clamping. However, it will be understood that in other embodiments the flange 234 and/or compression spring 201 may be omitted from the fastener. In such an embodiment, the compression spring may push against the end of the sleeve and the end of the slots in the protective sleeve may push against the "T" shaped extensions 118 in the splitter bar 106.

The clamping unit 104 includes the clamping legs 108 divided into shanks 202 and feet 120 extending therefrom. The clamping legs 108 are positioned at the lower end 126 of the clamping unit 104. The upper end 127 of the clamping unit 104 is indicated in FIG. 2. The shanks 202 can be conceptually divided into an upper section 206 where the clamping legs 108 run substantially parallel to one another and a lower section 208 where the clamping legs 108 radially converge towards one another in an unclamped configuration (e.g., neutral configuration). Specifically, in the illustrated example, interior surfaces 124 of the clamping feet 120 are in contact with one another. As previously, discussed the clamping legs 108 are flexible such that they bend outwardly during clamp-up. The profile and/or material construction of the lower section 208 of the clamping legs 108 may be selected to achieve a desired amount of leg flexion. For instance, the lower section 208 may have a tapered profile in a direction extending towards the clamping unit's lower end 126. In other examples, the lower section 208 of the clamping legs 108 may have a concave portion. However, numerous suitable clamping legs profiles may be used.

An upper interior surface 210 in the clamping unit 104 spans a gap 212 between the clamping legs 108. To elaborate, the gap 212 is positioned between interior surfaces 213 of the clamping legs 108. The upper interior surface 210 may axially delimit movement of the splitter bar 106. In another example, the clamping legs 108 may be formed as discrete legs and are captured by the nut in the form of a nut cage. However, fasteners with discrete legs may be less robust when compared to fasteners with the clamping unit that forms a continuous shape.

An extension 214 projects from the nut cage 200. The extension 214 is sized to allow the clamping unit 104 to be retained in the body 102, shown in FIG. 1. The extension 214 axially delimits movement of the protective sleeve 110. In this way, the fastener may remain as a cohesive unit during workpiece installation and removal. The extension 214 has a cylindrical shape, in the illustrated example. Thus, the extension 214 has a curved outer surface 216. However, other shapes of the extension 214 have been contemplated, such as polygonal shapes, oval shapes, etc.

The protective sleeve 110 includes the two slots 116 opening into a central cavity 217. The diameter 219 of the central cavity 217 is greater than a diameter 225 of upper section 206 of the clamping legs 108. In this way, the clamping legs 108 may be inserted within the sleeve 110, when the fastener is assembled. The slots 116 axially extend down a length of the protective sleeve 110. In the illustrated example, the slots 116 are positioned on opposing sides of the sleeve. Specifically, in the illustrated embodiment, the slots 116 are separated by 180° as measured about the central axis 122. However, in other embodiments, the slots 116 may be non-symmetrically arranged about the central axis. Still further in other examples, the sleeve may include another pair of slots. In such an example, the slots may be sequentially spaced around the central axis by 45° increments. However, other slot arrangements have been envisioned. A slot is defined herein as an opening with a boundary forming a closed shape. The shape in the illustrated example is an elongated slit. However, numerous suitable shapes have been envisioned.

Specifically, in the illustrated example, each of the slots 116 include two sidewalls 218 and two end walls 220 (e.g., an upper and lower end wall). A lower reinforcement section 117 of the sleeve's housing 227 circumferentially surrounds the central axis 122 to form the lower end walls. Thus, the lower reinforcement section 117 bounds the lower side of each of the slots 116. The protective sleeve 110 includes an upper reinforcement section 223 circumferentially surrounding the central axis 122 above the slots 116 thereby forming the upper end walls. In this way, the slots form a closed shape and the structural integrity of the sleeve is increased. To elaborate, the upper reinforcement section 223 and the lower reinforcement section 117 increase the ability of the sleeve to carry shear and bending loads and strengthen the portion of the sleeve extending there between.

It will be understood that the protective sleeve 110 also allows the fastener assembly to be efficiently inserted and removed from workpiece by reducing the friction between the fastener and the workpieces. For example, by providing the sleeve in the fastener the likelihood of the clamping feet and other components in the fastener hanging up during installation and removal is reduced. The protective sleeve also increases the stiffness of the fastener, creating enhanced alignment in the fastener. Additionally, the diametrical tolerances of the protective sleeve (e.g., one-piece protective sleeve) can be held much tighter, if desired, than previous three-piece splitter bar style fasteners and can thus provide increased fastener alignment across numerous usage scenarios.

The two sidewalls 218 in the slots are parallel to one another, in the illustrated example. However, in other examples, at least a portion of the sidewalls may not be parallel. For instance, the sidewalls may taper in a direction extending toward a lower end 224 of the sleeve 110. Additionally or alternatively, the sections of the sidewall may be curved. For instance, one or more of the sidewalls may include concave and/or a convex section(s). Additionally, in the depicted example, the slots have a similar shape and size. However, in other examples, the slots may not have a similar profile.

The protective sleeve 110 includes a flange 234 at an upper end 236. The flange 234 may be fixedly attached to an upper section of the clamping legs 108, in one example. However, in another example, the flange and other portions of the sleeve are not directly attached to the clamping legs 108. Rather, the radial expansion/contraction of the legs may push the sleeve upward/downward when the fastener is transitioned between a clamping configuration and an unclamped configuration. In such an example, the nut cage 200 in the clamping unit 104 may function to axially delimit upward movement of the sleeve 110. The outer diameter 238 of the flange 234 may be larger than an inner diameter 240 of lip 112, shown in FIG. 4. Thus, the flange 234 may be allowed to axial translate in the body but is prevented from falling out of the bottom of the body. The flange 234 may act as a landing for a spring positioned in the body 102, shown in FIG. 1, as previously discussed. When the flange 234 acts as a landing for the compression spring, the compression spring may be positioned between the nut cage 200 and the flange 234.

A width 232 of the splitter bar 106 is less than a width 242 of the gap 212 between the clamping legs 108 in the upper section 206 of the clamping unit 104. In this way, the splitter bar 106 may be positioned between the legs of the splitter bar. The slots 116 have a length 226 and a width 228. The length 226 runs in direction parallel to the central axis 122 and the width 228 runs in a direction perpendicular to the length. The other lengths of the fastener components are also parallel to the central axis 122.

The length 226 of the slots 116 may be greater than a length 230 of the splitter bar 106. Additionally, the width 228 of the slots 116 may be greater than the width 232 of the splitter bar 106. In this way, the splitter bar 106 may be efficiently mated with the protective sleeve 110 during assembly of the fastener assembly 100. To elaborate, during assembly of the fastener, the clamping unit 104 may be mated with the protective sleeve 110. Subsequently, the splitter bar 106 is slid through the slots 116 in the sleeve 110 and between the clamping legs 108. In this way, the splitter bar may be efficiently assembled with the sleeve and the clamping unit.

The splitter bar 106 includes the "T" shaped extensions 118 at an upper end 244. The upper end 244 may be anchored to the body 250. In doing so, the sleeve is bound on one end by the nut cage 200, and on the other by the "T" bar of the splitter. In use, the nut cage 200 may be pulled up onto the body and in doing so the fingers are opened by the splitter bar 106. Once the fingers are opened, they will be larger than the other end of the sleeve 110 and while going through a clamping operation will also act to force the sleeve to travel with them as they are pulled into the body. In one example, the sleeve 110 may stay substantially stationary as the end of the slots rests against the "T" while the fingers are opening and then travel with the fingers at the urging of the now expanded clamping feet. However, the flange 234 of the sleeve 110 may be included in the fastener to act as a landing for reacting a spring. In such an example, the compression spring may sit between the nut cage 200 and a proximal end of the sleeve. The spring may be sized to urge the sleeve toward the "T". However, it will be understood that the spring may travel with the sleeve as the expanded clamping feet are now in contact with the other end of the sleeve during the clamping operation and are forcing the sleeve to travel in tandem. In addition, the fastener may be designed such that the flange 234 cooperates with the lip 112 to limit the axial motion in a direction opposite of clamping. However, flange 234 is optionally included in the fastener. The spring can still, in theory, push against the end of the sleeve and the end of the slot can still push against the "T".

The extensions 118 each include two opposing planar surfaces 246, in the illustrated example. Furthermore, each of the extensions 118 radially extend from a central axis 122 of the fastener and correspondingly the bar. To elaborate, the extensions 118 extend at straight angle with regard to one another, in the illustrated example. However, in another example, the extensions 118 may be angularly separated by a non-straight angle. In such an example, the extensions 118 are arranged non-symmetrically about the bar. Further, in other examples, the splitter bar may include three or more extensions. The sleeve may correspondingly include additional slots for the added extensions. In such an example, the second pair of extensions may be separated at straight angle. Therefore, in this example, sequential extensions may be equivalently angularly separated. However, numerous suitable extension arrangements have been envisioned, such as non-equivalent angular arrangements. Additionally, the extensions 118 include planar surfaces 248 at their lateral sides. Other surface profiles of the lateral sides of the extensions may be used, in other embodiments. It will be understood that the extensions 118 and/or other portions of the splitter bar may be fixedly attached to the body 102, shown in FIG. 1. In this way, the splitter bar is held in a desired orientation and position.

Continuing with FIG. 2, the splitter bar 106 includes a body 250 extending from the extensions 118. The body 250 includes two opposing planar surfaces 252. In the depicted embodiment, the surfaces 252 extend from the upper end 244 of the bar to the lower end 254 of the bar. However, in other embodiments, at least a portion of the opposing surfaces may have a curved contour (e.g., convex and/or concave profiles) and/or the opposing surfaces may taper in a downward direction 256. A sidewall 258 extends between the opposing surfaces 252. The sidewall 258 is planar, in the illustrated example. However, the sidewall 258 may be curved inward or outward toward the central axis 122, in other examples.

The lower end 254 of the splitter bar 106 includes a curved surface 260, in the illustrated example. The curve surface allows the clamping legs 108 to be smoothly spread apart during fastener actuation. As a result, abrasive wear between the bar and the legs is reduced, thereby increasing fastener longevity. However, a non-curved lower surface of the splitter bar has been contemplated.

Figure 3:
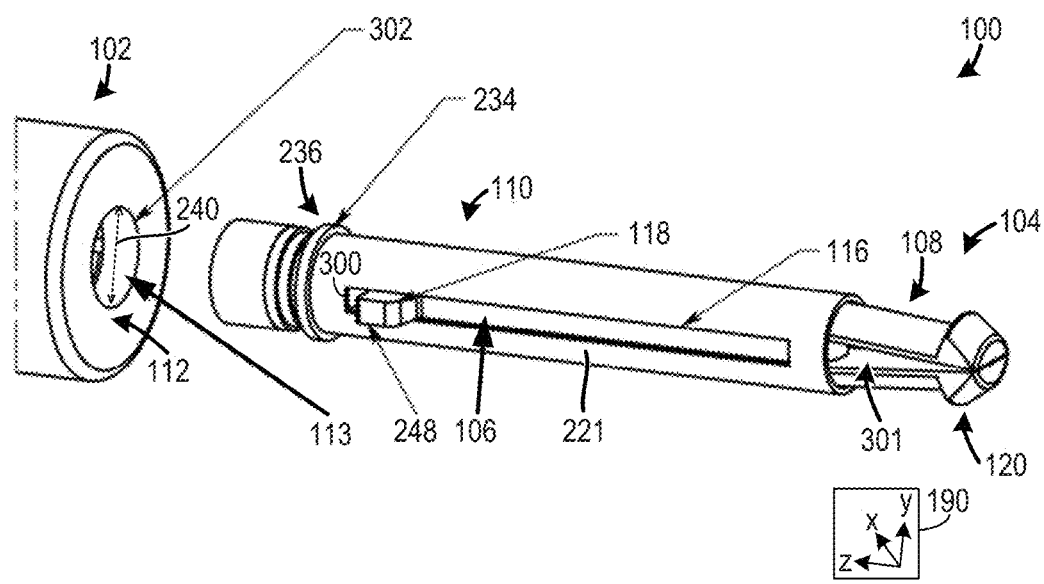
FIG. 3 shows a partially disassembled view of the fastener assembly with the clamping unit in an unclamped configuration.

FIG. 3 shows the fastener 100 with the splitter bar 106, clamping unit 104, and the protective sleeve 110 in an assembled state. The splitter bar, clamping unit, and protective sleeve are however not positioned in the body to allow structural features obscured by the body to be revealed, in FIG. 3. Nevertheless, it will be understood that the splitter bar, clamping unit, and protective sleeve may be mated with the body when the fastener is assembled. For example, the splitter bar, clamping unit, and protective sleeve may be inserted as a common piece through an opening in the upper end of the body. When placing the splitter bar, clamping unit, and the sleeve in the body, the drive mechanism 140, shown in FIG. 1, may be removed (e.g., unthreaded) from the body.

The clamping unit 104 is an unclamped configuration in FIG. 3. In the unclamped configuration, the clamping legs 108 converge towards one another. Specifically, in the illustrated example, the legs 108 do not radially extend beyond the outer surface 221 of the sleeve 110. In this way, the fastener may be inserted through workpiece apertures prior to clamp-up. Additionally, in the illustrated example, a gap 301 exists between sections of the legs 108 above the sections of the clamping feet 120 contacting one another, in the fastener's unclamped configuration. Consequently, the splitter bar 106 may smoothly push the legs outward when the fastener is transitioned into the clamping configuration. However, other clamping leg arrangements in the unclamped configuration have been contemplated.

FIG. 3 shows the extensions 118 extending radially outward through the slots 116 in the protective sleeve 110. As previously discussed, the extensions may be coupled (e.g., fixedly coupled) or otherwise positioned in a substantially fixed location in the body 102 when the fastener is assembled.

FIG. 3 also depicts the extensions 118 in the splitter bar 106 positioned near an upper end wall 300 of the slots 116. Positioning the upper end 236 of the sleeve 110 near the splitter bar 106 places the clamping unit 104 in the unclamped state. As previously mentioned, in the unclamped state, the clamping feet 120 are in their neutral position, converging toward one another, allowing the fastener to be inserted into the workpieces. Additionally, the lip 112 includes an edge 302 around the opening 113. The edge 302 has a circular shape, in the illustrated example. However, other contours of the lip have been contemplated. FIG. 3 illustrates the surfaces 248 of the extensions 118 positioned radially beyond the outer surface 221 of the protective sleeve 110.

Figure 4:
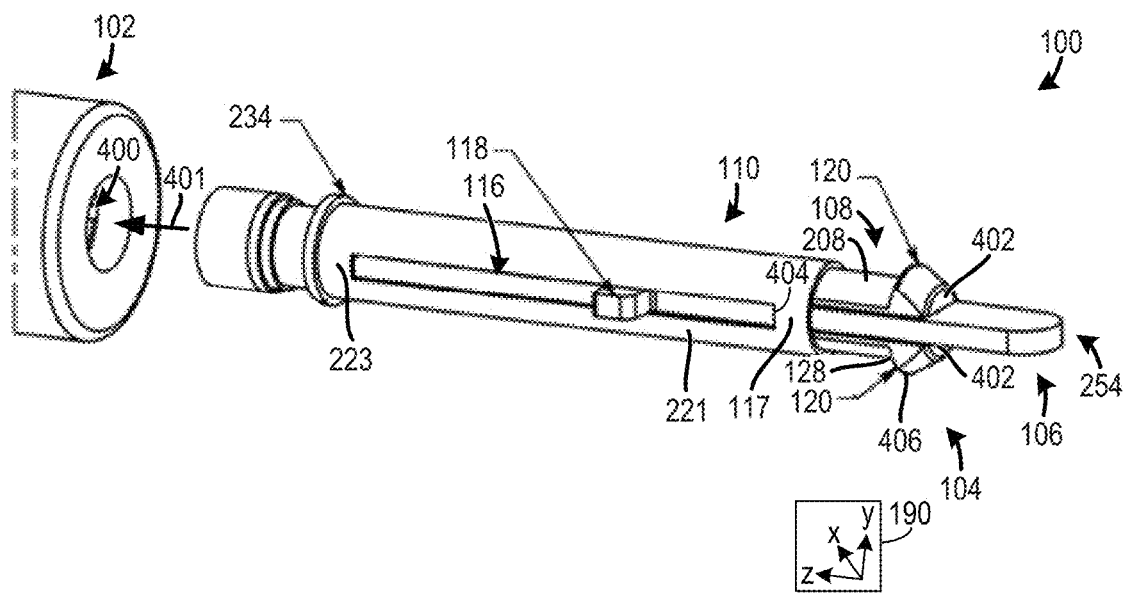
FIG. 4 shows the fastener assembly in a partially disassembled state with the clamping unit in a clamped configuration.

FIG. 4 shows the splitter bar 106, clamping unit 104, and the protective sleeve 110. However, FIG. 4 again illustrates the aforementioned components outside of the body 102. However, it will be understood that these component may be placed in an interior cavity 400 of the body 102 in an assembled state, as indicated by arrow 401.

In FIG. 4, the clamping unit 104 is in the clamping configuration where the splitter bar 106 is moved between the clamping feet 120 to radially shift the feet outward into a clamping configuration. Specifically, the lower end 254 of the splitter bar 106 is positioned axially below the clamping legs. However, it will be understood that when the lower end 254 of the splitter bar 106 reaches the bottom surfaces 402 of the clamping feet 120, the fastener is in a clamped configuration. In the clamping position, the lower sections 208 of the clamping legs 108 bend outward and have a planar shape. However, other clamping leg profiles, in the clamping position, have been contemplated. Additionally, the clamping surfaces 128 in the clamping feet 120 are radially aligned in the clamping configuration, in the illustrated example. However, in other examples, the clamping surface 128 may not be parallel to a radial plane, in the clamping configuration. Furthermore, it will be understood that the outer edge 406 of the clamping feet 120 are positioned radially beyond the diameter of the outer surface 221 of the protective sleeve 110.

Additionally, when the fastener is transitioned into the clamping configuration, the position of the slots 116 in the sleeve 110 with regard to the extensions 118 in the splitter bar 106 shift. Specifically, the extensions 118 are positioned closer to a lower end wall 404 of the slots 116. It will be understood, that the protective sleeve 110 may travel upwards when the clamping unit travels upward. Upward protective sleeve movement during clamping may be achieved through an interaction between the clamping legs and the sleeve that urges the sleeve axially upward. However, other suitable mechanisms for axially translating the sleeve and clamping unit in tandem during fastener clamping and/or unclamping have been contemplated.

Figure 5:
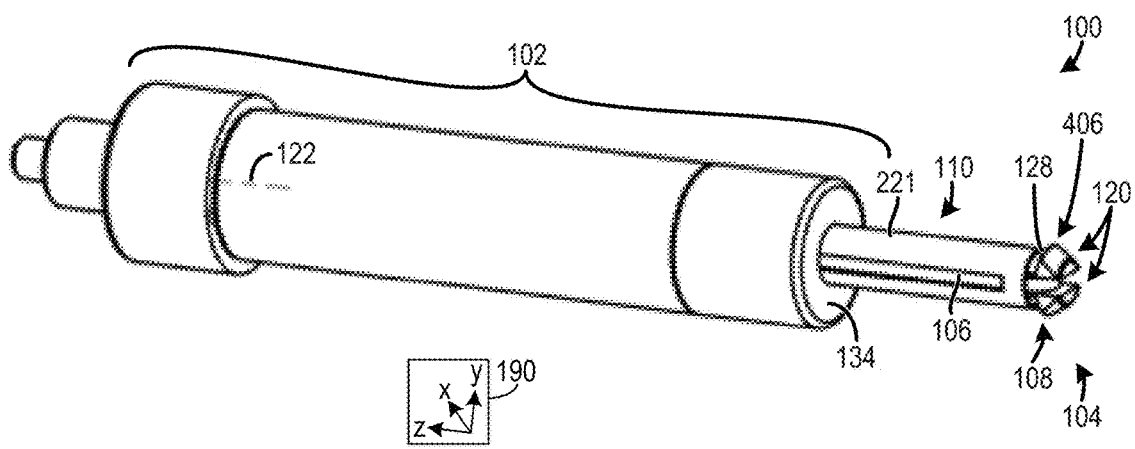
FIG. 5 shows an assembled view of the fastener assembly, shown in FIG. 1, in a clamping configuration.

FIG. 5 shows an assembled view of the fastener assembly 100. As depicted, the clamping unit 104 and protective sleeve 110 are correspondingly drawn upwards into the body 102 while the splitter bar 106 position remains substantially stationary when the fastener is transitioned into the clamping configuration from the unclamped configuration. As such, the splitter bar 106 is positioned between the clamping feet 120 to radially expand the feet and place the clamping surfaces 128 in the feet in a clamping position. Specifically, in the clamping position the outer edge 406 of the feet are again shown extending radially beyond the outer surface 221 of the sleeve 110. The face 134 of the body 102 acting as an upper clamping surface, is shown in FIG. 5.

The protective sleeve 110 partially circumferentially encloses a portion of the clamping legs 108, guarding the clamping legs and splitter bar against abrasive wear during workpiece insertion/removal and reducing the amount of external loads (e.g., shear loads) transferred to the clamping legs during workpiece clamping. Furthermore, as previously discussed the sleeve 110 may aid in fastener alignment during insertion and removal as well as allow shear and bending stresses to be decoupled from the clamping legs, if desired. In this way, the likelihood of fastener degradation during clamping/unclamping action is reduced and the fastener is significantly strengthened.

Figure 6:
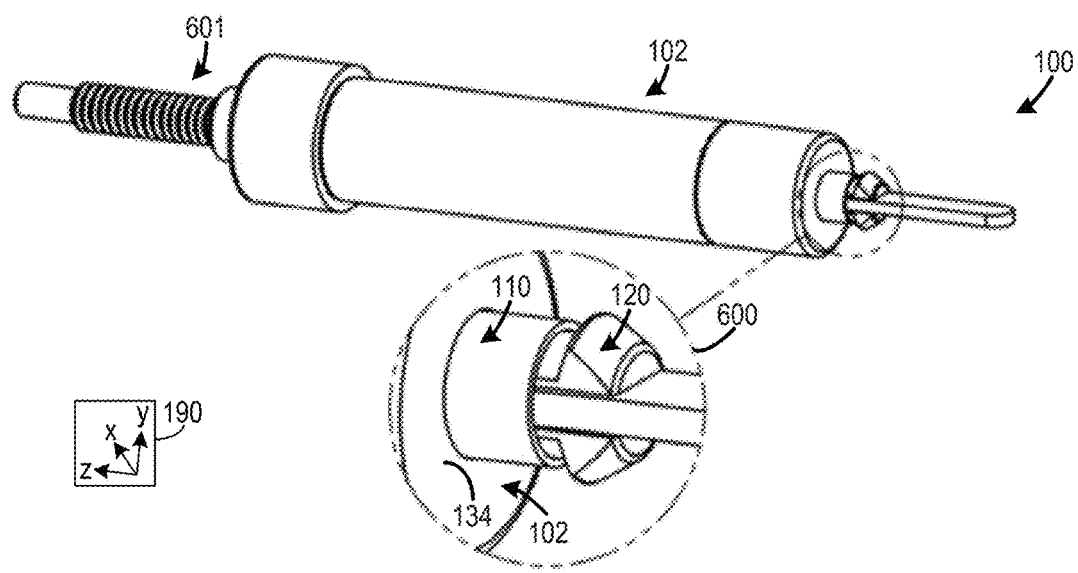
FIG. 6 shows an assembled view of the fastener assembly, shown in FIG. 1, in another clamped configuration.

FIG. 6 shows the fastener 100 in another clamping configuration where fastener's grip length is reduced. As shown, at enlarged view 600, the sleeve 110 travels further into the body 102 and the clamping feet 120 are therefore drawn closer to the face 134 of the body. FIG. 6 shows a stud 601 that may be included in the drive mechanism 140, illustrated in FIG. 1.

FIG. 7 shows a portion of the fastener 100 with the optional spring 201 adjacent to the upper end 236 of the sleeve 110. As previously discussed, the flange 234 or other section of the sleeve 110 may act as a landing for the spring 201. As such, the compression spring may sit between the nut cage 200 and the outer diameter 238 of the flange 234, shown in FIG. 2, and may be sized to urge the protective sleeve 110 towards the "T" shaped extensions 118 of the splitter bar 106. It will be appreciated that the opening 113 in the body 102, shown in FIG. 1, may be sized to allow for free travel of the sleeve but may be smaller in diameter than the flange 234. As such, the spring force may hold the flange against the back-side of the opening in the body, extending (e.g., maximally extending) the sleeve axially away from the body. It will also be understood that, in one example, the spring force may be overcome by retracting the clamping feet but not necessarily during fastener insertion into a group of parts slated for clamping.

Figure 8:
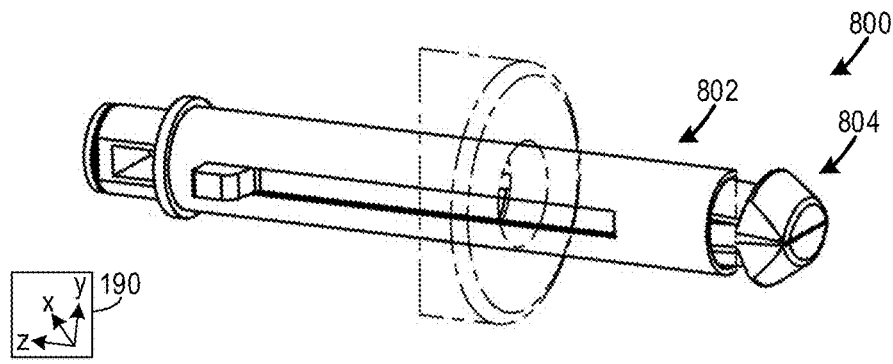
FIG. 8 shows another embodiment of a fastener.

In yet another embodiment shown in FIG. 8, a fastener 800 with a sleeve 802 may be fixedly coupled (e.g., fused) to clamping feet 804. The fastener 800 shown in FIG. 8 may include several components, features, etc. included in the fastener 100, shown in FIGS. 1-7. Therefore, redundant description is omitted for brevity. In the fastener embodiment shown in FIG. 8, the sleeve may be sized so that it sits close to the end of the clamping feet but does not interfere with opening/closing of the feet. As such, the sleeve may be positioned to provide a larger amount of leg protection, load decoupling, etc., during use at various axial displacements. It will be appreciated that in the embodiment of the fastener 800, shown in FIG. 8, the spring may be omitted from the assembly.

Figure 9:
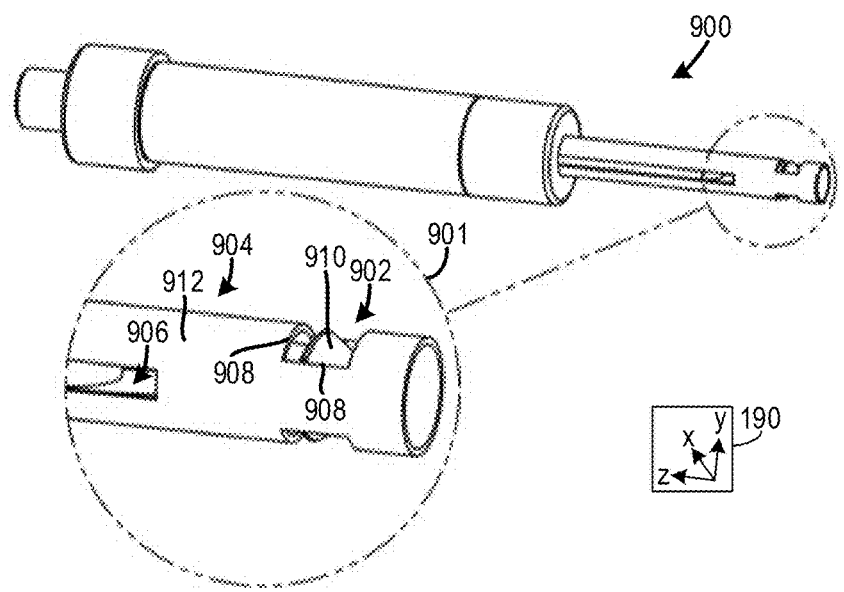
FIGS. 9-10 show yet another embodiment of a fastener.
Figure 10:
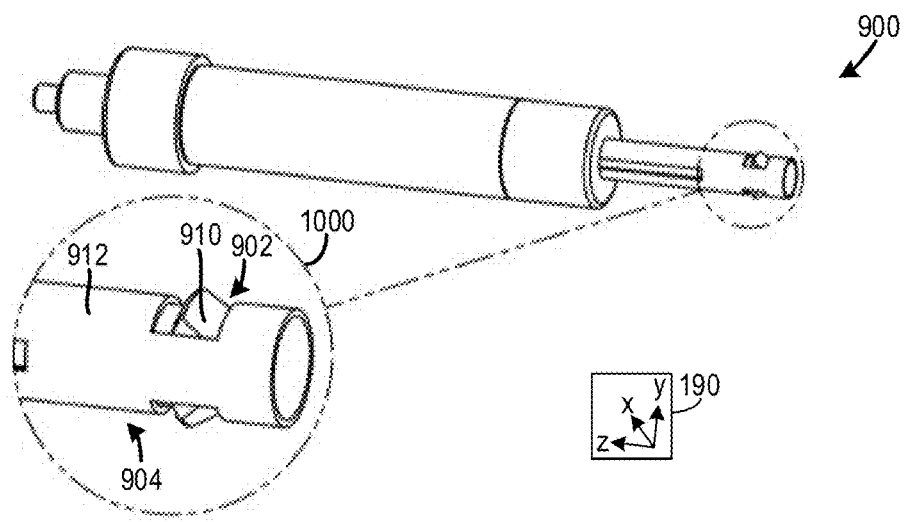

FIGS. 9-10 illustrate another embodiment of a fastener 900. The fastener 900 shown in FIGS. 9-10 includes several components, features, etc. included in the fastener 100, shown in FIGS. 1-7. Therefore, redundant description is omitted for brevity.

Turning to FIG. 9, illustrating the fastener 900 in an unclamped configuration. Enlarged view 901 shows openings 902 (e.g., windows) in a sleeve 904 arranged below slots 906. The openings extend through the sleeve into an interior cavity. The openings 902 include walls 908 bounding clamping feet 910. To elaborate, the walls extend above and below the clamping feet as well as down the sides of the feet. As such, the openings 902 serve to protect the clamping feet from abrasive wear, hanging up, etc., during fastener insertion and removal.

The feet 910 are retracted in FIG. 9 and may not extend beyond an outer surface 912 of the sleeve. However, in FIG. 10 the fastener 900 is arranged in a clamping configuration. In the clamping configuration, the feet 910 are pushed outward and extend radially outward from the outer surface 912 of the sleeve 904, indicated at enlarged view 1000. It will be understood, that the openings 902 in the sleeve 904 allows additional loads (e.g., shear and bending loads), and the stresses that these loads create, to be decoupled from the clamping feet and correspondingly the clamping legs. Consequently, the loads experienced by the fastener during use are transferred to a stronger component (i.e., the sleeve) more apt to carry the loads, reducing the chance of fastener degradation.

In another embodiment, a fastener may be provided with the "T" section of the spreader bar positioned at least partially outside of the protective sleeve. To accomplish this structural arrangement, the length of the body and of the shank portion of the legs may be increased, in comparison to the fastener shown in FIGS. 1-10, and the "T" section may have a shorter length that anchors the spreader bar into the body. In one example, the lengths of the body, legs, and spreader bar may be increased such that the anchor of the spreader bar does not come into to contact with the protective sleeve. This embodiment of the fastener may operate as described without the use of slots in the protective sleeve. In such an embodiment, throughout the process of inserting, opening, and clamping the fasteners, the protective sleeve is still distal of the anchors of the spreader bar. As such, the protective sleeve may not have slots and may therefore be stronger than a slotted sleeve. In another example, the lengths of the body and the shank portion of the legs may be increased to smaller degree. In this case, the slots in the protective sleeve may be used but the slots may start at the proximal end of the sleeve and only traverse a portion of the sleeve. Further, in this example, one end of the splitter bar may be absent of a reinforcing ring structure and the other end of the splitter bar (towards the clamping feet of the legs) may have an enhanced reinforcing ring structure.

Figure 11:
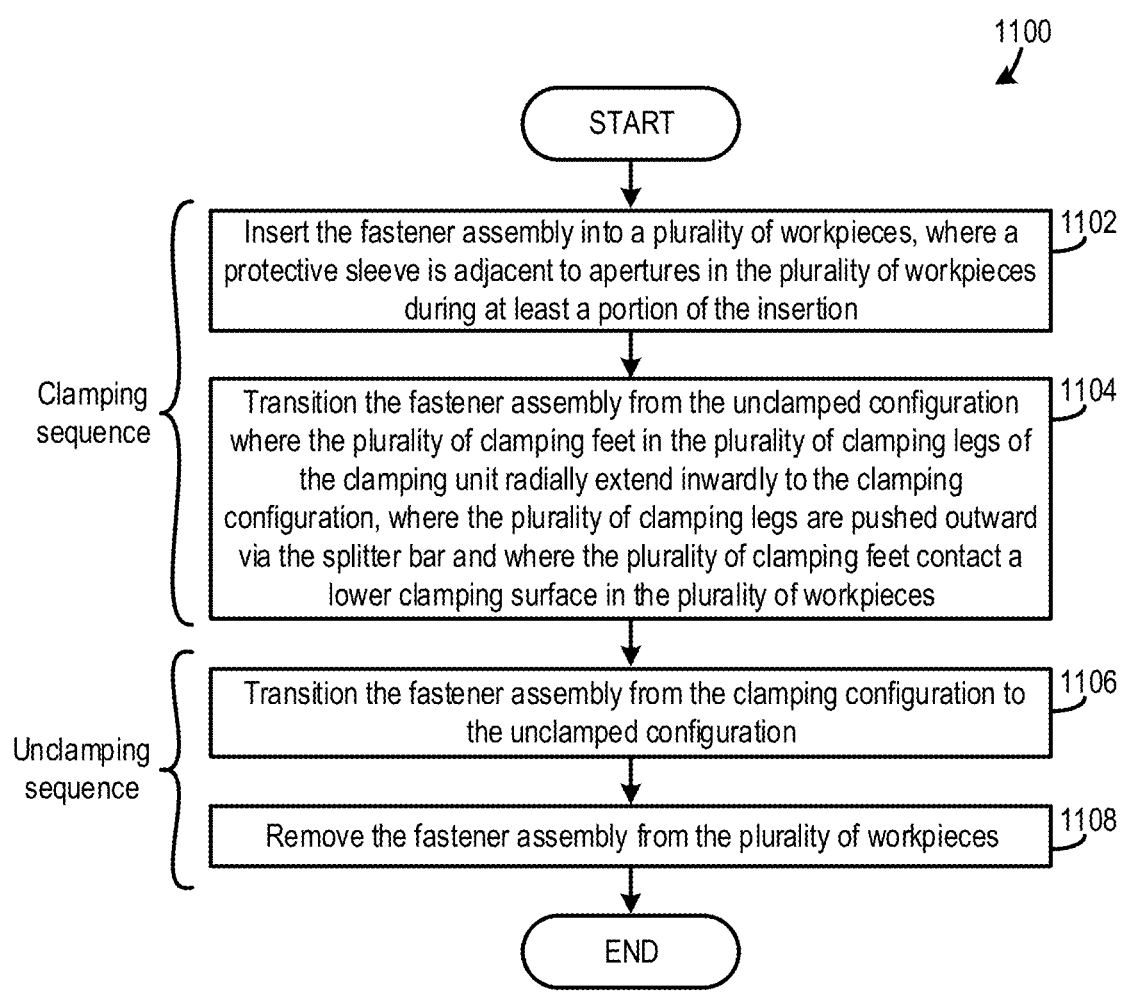
FIG. 11 shows a method for installing and removing a fastener assembly from workpieces.

FIG. 11 shows a method 1100 for operating a fastener assembly. The method 1100 may be implemented by any of the fastener assemblies or combinations of the fastener assemblies as well as tooling apparatuses described above with regard to FIGS. 1-10. However, in other examples, the method 1100 may be implemented by other suitable fastener assemblies and/or tooling apparatuses. It will be appreciated that the method 1100 may be at least implemented in part via an automated process. As such, the instructions for the method steps may be stored in non-transitory memory that when executed by the processor cause the controller to carry out the method steps. It will be understood that the memory and processor may be included in hardware of tooling apparatuses. However, at least some of the steps, in some examples, may be implemented via manufacturing personnel manually operating tooling devices.

At 1102, the method includes inserting the fastener assembly into a plurality of workpieces. It will be appreciated that the protective sleeve is adjacent to apertures in the plurality of workpieces during at least a portion of the insertion. In this way, the clamping legs and the splitter bar are protected from abrasive wear during fastener insertion/removal. As previously discussed, the protective sleeve may include a flange axially delimited by a nut cage of the clamping unit. In such an example, the lip in the body of the fastener axially retains the sleeve and the clamping unit. Consequently, the sleeve may be retained in the body of the fastener.

At 1104, the method includes transitioning the fastener assembly from the unclamped configuration where the plurality of clamping feet in the plurality of clamping legs of the clamping unit radially extend inward to the clamping configuration where the plurality of clamping legs is pushed outward via the splitter bar and where the plurality of clamping feet contacts the lower clamping surface in the plurality of workpieces. In one specific example, during the transition between the unclamped configuration and the clamped configuration, the protective sleeve axially translates toward an upper end of the fastener assembly when the clamping unit axially translates toward the upper end of the fastener assembly.

At 1106, the method includes transitioning the fastener assembly from the clamping configuration to the unclamped configuration. To elaborate, the clamping unit is axially translated in a downward direction moving the radially converging region of the clamping legs away from the splitter bar. Consequently, the clamping legs are allowed to return to their neutral state in which they are bent inwardly. When the clamping legs converge in this manner, the clamping feet in the legs disengage from an outer surface of the workpiece.

Next at 1108, the method includes removing the fastener assembly from the plurality of workpieces. In this way, the fastener assembly is efficiently transitioned between the clamping and unclamping states. It will be understood that steps 1102-1104 occur during a clamping sequence and steps 1106-1108 occur during an unclamping sequence.

Figure 12:
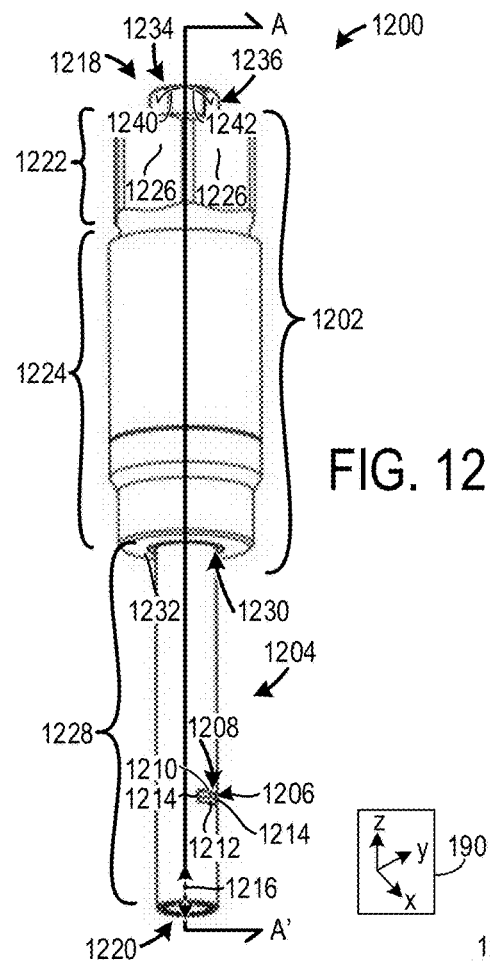
FIGS. 12-14 show a first example of a fastener transitioned from a disengaged configuration to an engaged configuration.

Turning specifically to FIG. 12 illustrating a fastener 1200 with an enclosure 1202 axially retaining sections of a sleeve 1204 and a collet body including clamping feet 1206. The clamping feet extend from flexible legs in the collet body. The flexible legs are designed to bend inward and outward such that the clamping feet radially contract and expand. The shape and/or material construction of the legs may be selected to provide a targeted amount of leg flexion. In the illustrated example, the legs are bent inwardly in their neutral configuration. In this way, the legs may return to a disengaged configuration after the stud is moved upward away from the collet body. However, other legs flexion characteristics have been contemplated.

The clamping feet 1206 extend through openings 1208 in the sleeve 1204. To elaborate, the sleeve openings 1208 extends around the clamping feet 1206. Each of the openings 1208 include an upper side 1210, a lower side 1212, and lateral sides 1214. The sides form an enclosed shape. The shape of the sides may be similar to the shape of the feet, in one instance. The sides have a substantially planar arrangement, as shown in FIG. 12. However, other shapes of the sides may be used, in other examples. For instance, the sides may have convex shapes, the openings may form an oval shape, etc.

As described herein certain components, component sections, etc., are referred to with regard to the following descriptive terms: above, below, upper, and lower. It will be understood that these terms are provided to infer the relative positions of various components, component constituents, etc. To elaborate, the fastener's central axis 1216 is employed to ascertain which comparative term to utilize. As defined herein, components, component sections, etc., closer to a first end 1218 of the fastener are referred to as upper components, sections, etc., with regard to other comparative components, component sections, etc. On the other hand, components, component sections, etc., closer to a second end 1220 of the fastener 1200 are referred to as lower components, component sections, with regard to other comparative components, component sections, etc. However, it will be understood that the fastener may or may not be aligned with a gravitational axis, when using the terms above, below, upper, and lower. Thus, the descriptive terms: above, below, upper, and lower are not globally delineated using a gravitational axis but are instead determined using the fastener's central axis regardless of its relative positioning with regard to a gravitational axis. Furthermore, the central axis 1216 is also provided in FIGS. 13-22, for reference, when appropriate. As described herein a radial direction is a direction perpendicular to the central axis 1216 of the fastener.

The enclosure 1202 includes a tooling interface 1222 and a cylindrical section 1224 positioned below the tooling interface. In the illustrated example, the tooling interface 1222 includes a plurality of polygonal faces 1226. However, other suitable types of interfaces may be employed or the tooling interface may be omitted from the fastener, in other examples.

A shank 1228 of the sleeve 1204 is shown extending through a lower aperture 1230 in the enclosure 1202. A lip 1232 defining the boundary of the lower aperture 1230 allows fastener components to be retained in the enclosure 1202.

Figure 15:
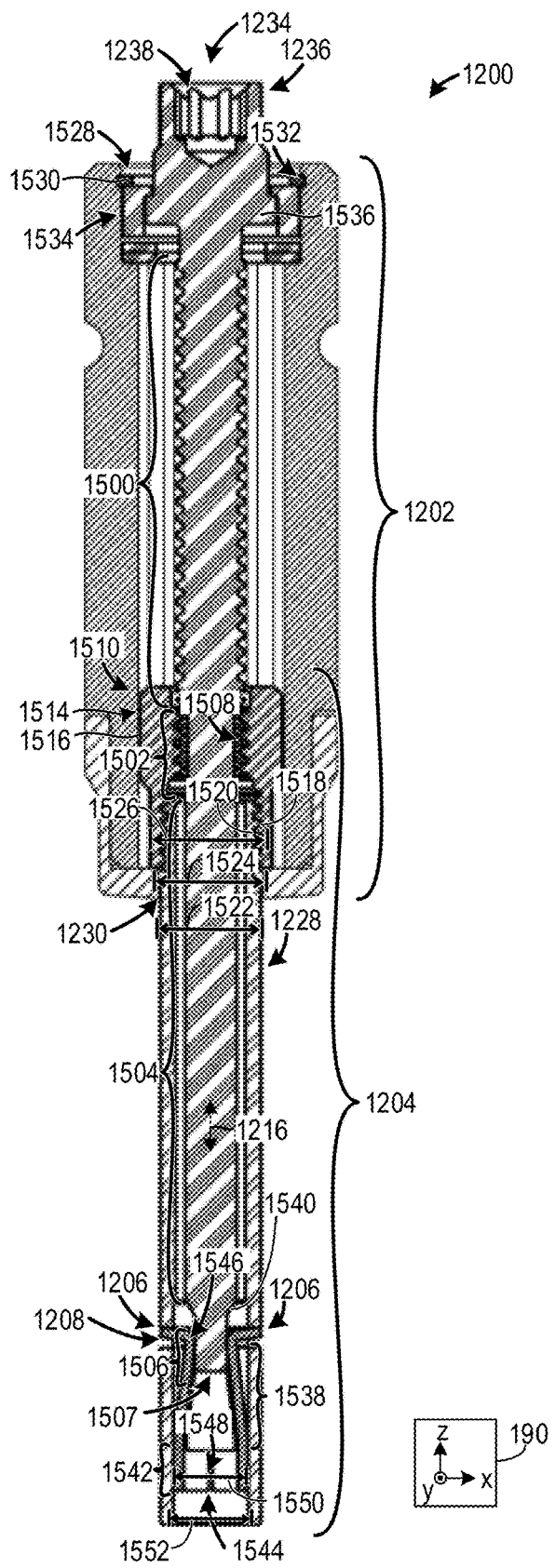
FIG. 15 depicts a cross-sectional view of the fastener, shown in FIG. 12, in a disengaged configuration.

A stud 1234 with a head 1236 having a tooling interface 1238, shown in FIG. 15, threadingly engages the sleeve 1204. Continuing with FIG. 12, rotation of the stud 1234 in a first rotational direction 1240 causes the sleeve to axial translate downward and rotation of the stud in the opposite rotational direction 1242 causes the sleeve to axial translate upwards. Stud rotation therefore enables adjustment in the grip length of the fastener. As the sleeve 1204 travels upwards the clamping feet 1206 are pushed radially outward into an engaged configuration, readying the fastener for workpiece clamping. Further axial translation of the collet body upwards decreases the fastener's grip length to accommodate for variations in workpiece thickness. Plane A-A', shown in FIG. 12, indicates the cross-section of FIG. 15 and Plane B-B', shown in FIG. 13, indicates the cross-section of FIG. 16.

Figure 13:
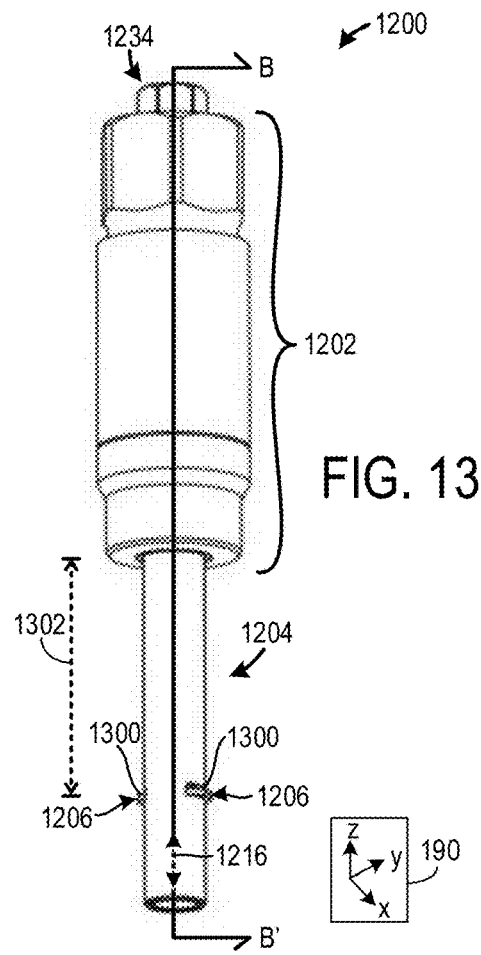

FIG. 13 shows the fastener 1200 in an engaged configuration. In the engaged configuration, the clamping feet 1206 are expanded radially outward and clamping surfaces 1300 in the feet are exposed for workpiece clamping. Again, the enclosure 1202, the sleeve 1204, and the stud 1234 are depicted. The sleeve 1204 is drawn into the enclosure 1202 via stud rotation to place the fastener 1200 in the engaged configuration. A grip length 1302 is indicated in FIG. 13. In particular, the grip length 1302 embodied in FIG. 13, is the fastener's maximum grip length. Fasteners with a variety of maximum and minimum grip lengths have been envisioned. The grip range may be selected based on end-use design goals.

Figure 14:
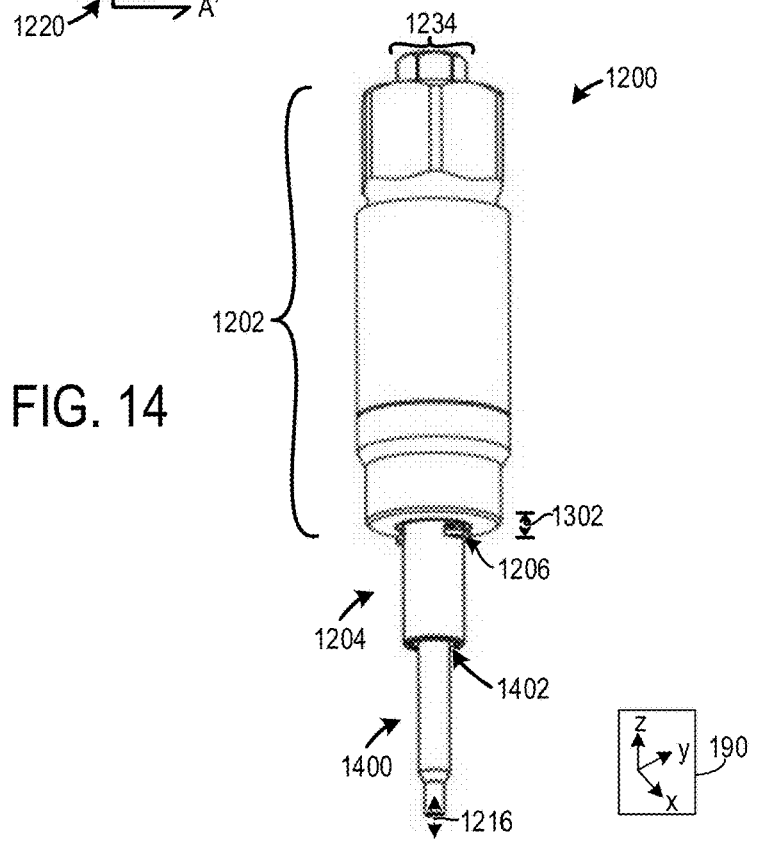

FIG. 14 again shows the fastener 1200 in the engaged configuration. As previously discussed, in the engaged configuration the clamping feet 1206 are readied for workpiece clamping. However, the grip length 1302 of the fastener has been decreased in FIG. 14. Specifically, the grip length 1302 embodied in FIG. 3 is a minimum grip length. Workpieces with thicknesses anywhere between the fastener's minimum grip length, shown in FIG. 14, and the maximum grip length, shown in FIG. 13, may be clamped by the fastener 1200. FIG. 14 again shows the enclosure 1202, sleeve 1204, and the stud 1234. FIG. 14 also shows a lower section 1400 of the stud 1234 extending below a lower aperture 1402 in the sleeve 1204. It will be understood that rotation of the stud 1234 in one direction induces upward axial movement of the sleeve 1204.

FIG. 15 shows a cross-sectional view of the fastener 1200 in a disengaged configuration. The enclosure 1202, stud 1234, and sleeve 1204 are again shown. The stud 1234 is shown including the head 1236 with the tooling interface 1238. The tooling interface 1238 is a recess with a polygonal shape in FIG. 15. However, other suitable tooling interface profiles may be used such as polygonal external surfaces, a slotted recess, etc.

The stud 1234 also may include a threaded section 1500, a first reduced diameter section 1502 (e.g., upper reduced diameter section), a leg expansion section 1504, and a second reduced diameter section 1506 (e.g., lower reduced diameter section). The first reduced diameter section 1502 allows the stud 1234 to freely spin when an axially translation threshold of the sleeve 1204 is reached. In this way, the fastener's sleeve is prevented from moving downward beyond a desired amount, thereby increasing tooling efficiency. The free spin feature may be particularly useful when tooling apparatuses are not designed to recognize when the fastener has reached maximum grip length. However, in other examples, the stud may not include the first reduced diameter section and therefore does not exhibit free spin functionality. The leg expansion section 1504 functions to open the legs and keep them open when the fastener is clamping, elaborated upon herein. Further, in some examples, the leg expansion section 1504 may not contact the flexible legs when the fastener is disengaged. Additionally, the leg expansion section may keep the crown and/or a top part of the individual legs located radially. In other words, the inside diameter of the sleeve and the outer diameter of the leg expansion section of the stud may trap or located the crown/top-of-the-legs. This may be true in both the engaged and disengaged configurations of the fastener. Further, in other examples, there may be a transition (e.g., angled section) between the first reduced diameter section of the stud and the leg expansion section.

The second reduced diameter section 1506, in one example, may be sized to fit between closed legs in the disengaged position without touching the legs to prevent the legs from closing any further and thus ensures that the feet cannot disengage from the window. It will be appreciated that the second reduced diameter section 1506 may not function to open the legs when the fastener is engaged. However, in other examples, the second reduced diameter section may be omitted from the stud.

Further, in other examples, the stud 1234 may include a threaded section extending to its distal end 1507. In such an example, a portion of the threaded section may function as a leg expansion feature when the fastener is transitioned into the engaged configuration. Further, in one case, the threaded section of the stud may have a substantially constant diameter along its length or in another case, the section of the threads functioning as the leg expansion section may have a smaller diameter than an upper threaded section. Still further in such an example, the stud may include a threaded section that has a smaller diameter than the expansion section and extends from the thread expansion diameter.

The threaded section 1500 of the stud 1234 threadingly engages with a threaded section 1508 of the sleeve 1204. This threaded engagement allows the sleeve to axially translate in response to stud rotation.

In the illustrated example, the sleeve 1204 is parsed into an upper unit 1510 and a shank 1228. The upper unit 1510 includes the threaded section 1508 in an interior, in the illustrated example. However, in other examples, the shank 1228 may additionally or alternatively include an interior threaded section. The upper unit 1510 includes an anti-rotation section 1514. The anti-rotation section 1514 includes a plurality of facets 1516 (e.g., planar faces) arranged in a polygonal shape (e.g., square, hexagonal, octagonal, etc.) However, other anti-rotation section profiles have been contemplated, such as two opposing planar faces and two opposing curved surfaces, pins, slots, splines, etc. In another example, the anti-rotation section 1514 may be constructed (e.g., machined) with the sleeve 1204 as a single piece. As such, the sleeve and anti-rotation section may have a one or two-piece construction, in different embodiments. Further in one example, an anti-rotation feature (e.g., hexagonal shape, splined shape, etc.) may be machined into the shank directly. The mating between the anti-rotation features in the sleeve 1204 and the enclosure 1202 allow the sleeve to axially translate without rotation, during fastener engagement and disengagement.

The shank 1228 includes a threaded section 1518 coupled to a threaded section 1520 in the upper unit 1510 forming a threaded interface. Specifically, the threaded section 1518 arranged on the exterior of the shank 1228 engages the threaded section 1520 arranged on the interior of the upper unit 1510. In other examples, the shank may include an interior threaded section threaded into an exterior threaded section of the upper unit. However, it will be understood that machining the upper unit and the shank in this manner may be more difficult and may not be as robust as the threaded interface arrangement, depicted in FIG. 15. The shank 1228 is shown extending through the lower aperture 1230. Thus, an outer diameter 1522 of the shank 1228 is less than a diameter 1524 of the lower aperture 1230. The diameter 1526 of a section of the upper unit 1510 is greater than the diameter 1524 of the lower aperture 1230 to enable the sleeve 1204 to be axially retained in the enclosure 1202. However, in other examples, the threaded interface in the sleeve may be shaped to allow sections of the sleeve to axially translate below the lower aperture in the enclosure. The openings 1208 in the shank 1228 with the feet 1206 positioned therein, are also shown in FIG. 15.

The fastener 1200 includes a stud retaining assembly 1528 with a retaining ring 1530 (e.g., snap ring) mated in a recess 1532 of the enclosure 1202. The stud retaining assembly 1528 further includes components 1534 (e.g., washers, spacers, etc.) axially retaining a lip 1536 of the head 1236 of the stud 1234. In this way, the stud's axial movement may be limited (e.g., substantially inhibited). However, in other examples, the stud 1234 may be designed with a greater amount of axial movement with regard to the enclosure 1202. Further, in other embodiments, the stud retaining assembly may be omitted from the fastener.

The second reduced diameter section 1506 is shown positioned between the clamping feet 1206 and a section of flexible legs 1538, thereby preventing the legs from being inwardly bent beyond a desirable amount. Consequently, a fastener condition where the legs are bent too far inward can be circumvented, increasing the fastener's reliability. It will be understood, however, that the second reduced diameter section 1506 is not designed to push the clamping feet 1206 outward into the engaged configuration, in the illustrated example. In other examples, the second reduced diameter section 1506 may have a different profile or may be omitted from the stud in certain designs.

An angled surface 1540 may be arranged between the second reduced diameter section 1506 and the leg expansion section 1504. In this way, the stud 1234 may smoothly urge the clamping feet 1206 outward into the engaged configuration.

A crown 1542 of collet body 1544 is shown arranged axially below the feet 1206 with the legs 1538 extending between the crown and the feet. Positioning the crown in this manner allows the feet 1206 to be initially expanded by the stud 1234 when the fastener is transitioned into an engaged configuration. Consequently, the fastener reliability is increased by avoiding an unwanted mode of fastener operation where sections of the flexible legs are axially urged outward but the clamping feet remain bent inward. As shown, the outer diameter 1550 of the crown 1542 is less than an inner diameter 1552 of sleeve 1204 to allow the collet body to be inserted into the sleeve during fastener assembly. Thus, the crown 1542 is positioned within the sleeve 1204 below the openings 1208 to protect the crown as well as provide additional structural reinforcement to the sleeve.

A junction 1546 between the clamping feet 1206 and the flexible legs 1538 is shown in FIG. 15. The crown 1542 of the collet body 1544 including an opening 1548 is illustrated in FIG. 15. The opening 1548 may be sized to allow the leg expansion section 1504 of the stud 1234 to pass there through when the fastener's grip length is decreased.

Additionally, the components of the fastener may be constructed out of a similar material such as metal (e.g., steel, aluminum, etc.), a polymer, etc., in one example. However, in other examples, the stud 1234, sleeve 1204, collet body 1544, and/or enclosure 1202 may be constructed out of different materials. For instance, the sleeve may be constructed out of aluminum while the collet body may be constructed out of a more spring-biased material, such as steel. Moreover, the materials used to construct the different components in the fastener may be chosen based on end use requirements. It will be appreciated that for structural applications (e.g., large load bearing structures) the fastener system may be constructed out of steel. On the other hand, when designed for commercial applications the fastener system may employ plastics. Further, in other examples, the fastener system may have a hybrid material construction where both plastic and metal are utilized.

Figure 16:
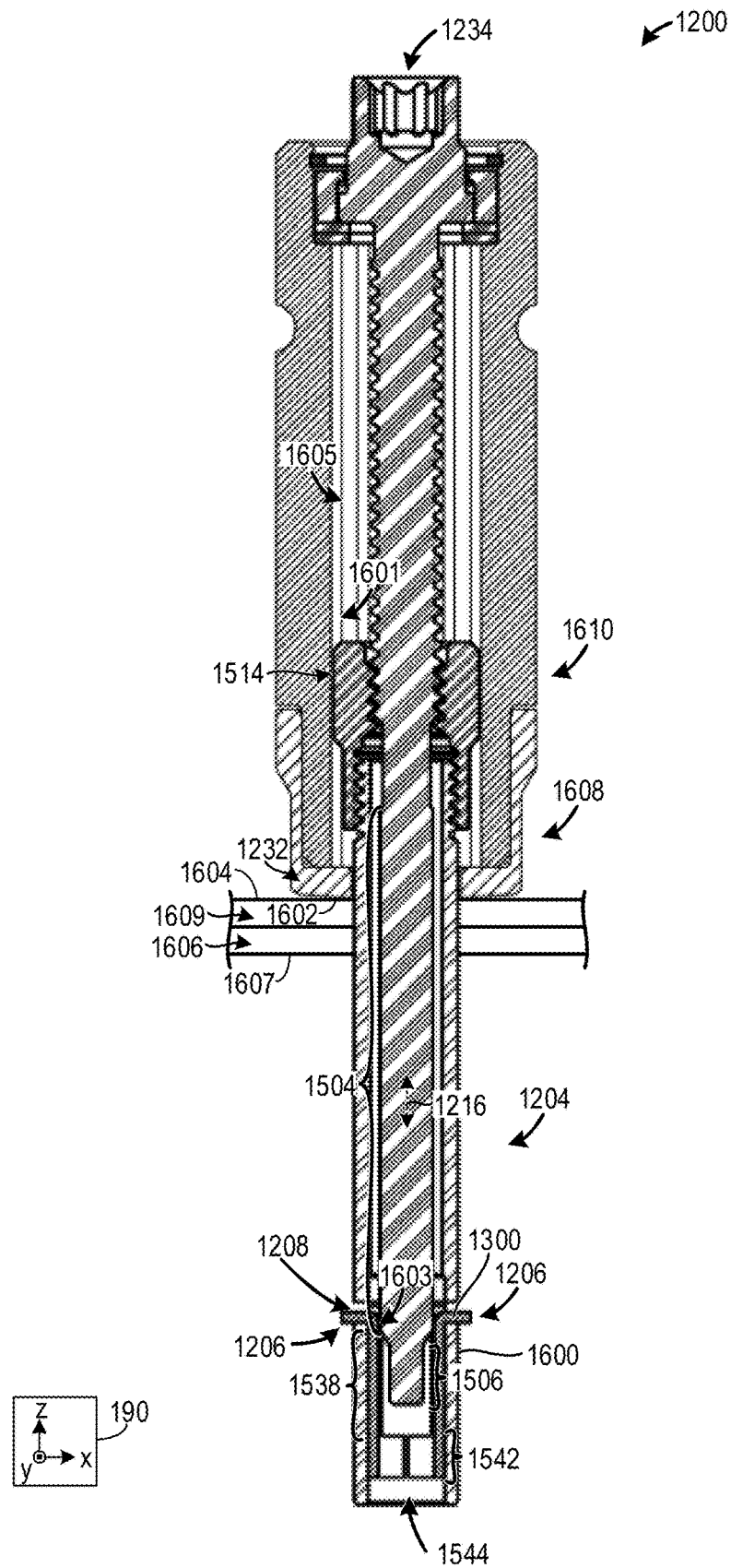
FIG. 16 shows a cross-sectional view of the fastener, shown in FIG. 13, in an engaged configuration.

FIG. 16 shows the fastener 1200 in an engaged configuration. As illustrated in FIG. 16, the sleeve 1204 is axially drawn further up into the enclosure 1202, changing the relative position of the sleeve 1204 and the stud 1234 to place the fastener in the engaged configuration readied for workpiece clamping. The axial translation is generated by rotation of the stud 1234. Additionally, the mating between an anti-rotation section 1601 in the enclosure 1202 and the anti-rotation section 1514 in the sleeve 1204 constrains (e.g., substantially prevents) rotation of sleeve with regard to the enclosure. Thus, the sleeve axially moves within the enclosure without substantial rotation. The anti-rotation section 1601 forms part of a boundary of an interior cavity 1605 of the enclosure 1202.

In the engaged configuration the feet 1206 are expanded radially outward to prepare the fastener for clamping. In particular, in the engaged configuration the feet 1206 extend through the openings 1208 and radially beyond an outer surface 1600 of the sleeve 1204, to prepare the feet for workpiece engagement. As shown, the feet 1206 are initially pushed outward by the leg expansion section 1504 of the stud 1234 prior to the leg expansion section contacting the flexible legs 1538. In this way, an undesirable fastener condition where the legs contact the stud but the feet remain bent inward in a disengaged configuration may be avoided. The interface 1603 between the leg expansion section 1504 of the stud 1234 and the flexible legs 1538 is illustrated in FIG. 16.

In the engagement configuration, a surface 1602 of the lip 1232 of the enclosure 1202 functions as an upper clamping surface engaging a surface 1604 in an upper workpiece 1609 and surfaces 1300 of the clamping feet 1206 function as a lower clamping surface. Although the clamping feet 1206 are shown spaced away from a lower workpiece 1606, the clamping feet 1206 may be drawn further upward to allow a surface 1607 of the lower workpiece 1606 to come into contact with the clamping feet. Moreover, workpieces with thicknesses anywhere between the maximum grip length, shown in FIG. 13, and the minimum grip length, shown in FIG. 14, may be clamped by the fastener.

Continuing with FIG. 16, the enclosure 1202 includes a clamping structure 1608 with the lip 1232 coupled (e.g., press fit, swaged, threaded, glued, brazed, machine (e.g., single piece machined), deep drawn (e.g., single piece deep drawn), etc., onto an upper casing 1610. The coupling technique, once completed, may substantially prevent rotation between the clamping structure and the upper casing.

However, in other embodiments, the enclosure 1202 may be manufactured via one-piece construction.

The crown 1542 of the collet body 1544 is again shown positioned axially below the second reduced diameter section 1506 of the stud 1234. However, it will be understood that in certain clamping configurations the lower end of the stud extends below the collet crown.

Collet legs 1538 are bent outward and have axial alignment in FIG. 16, enabling the stud to be axially translated there between. The legs 1538 may, however, have other profiles in the engaged configuration, in other examples.

Figure 17:
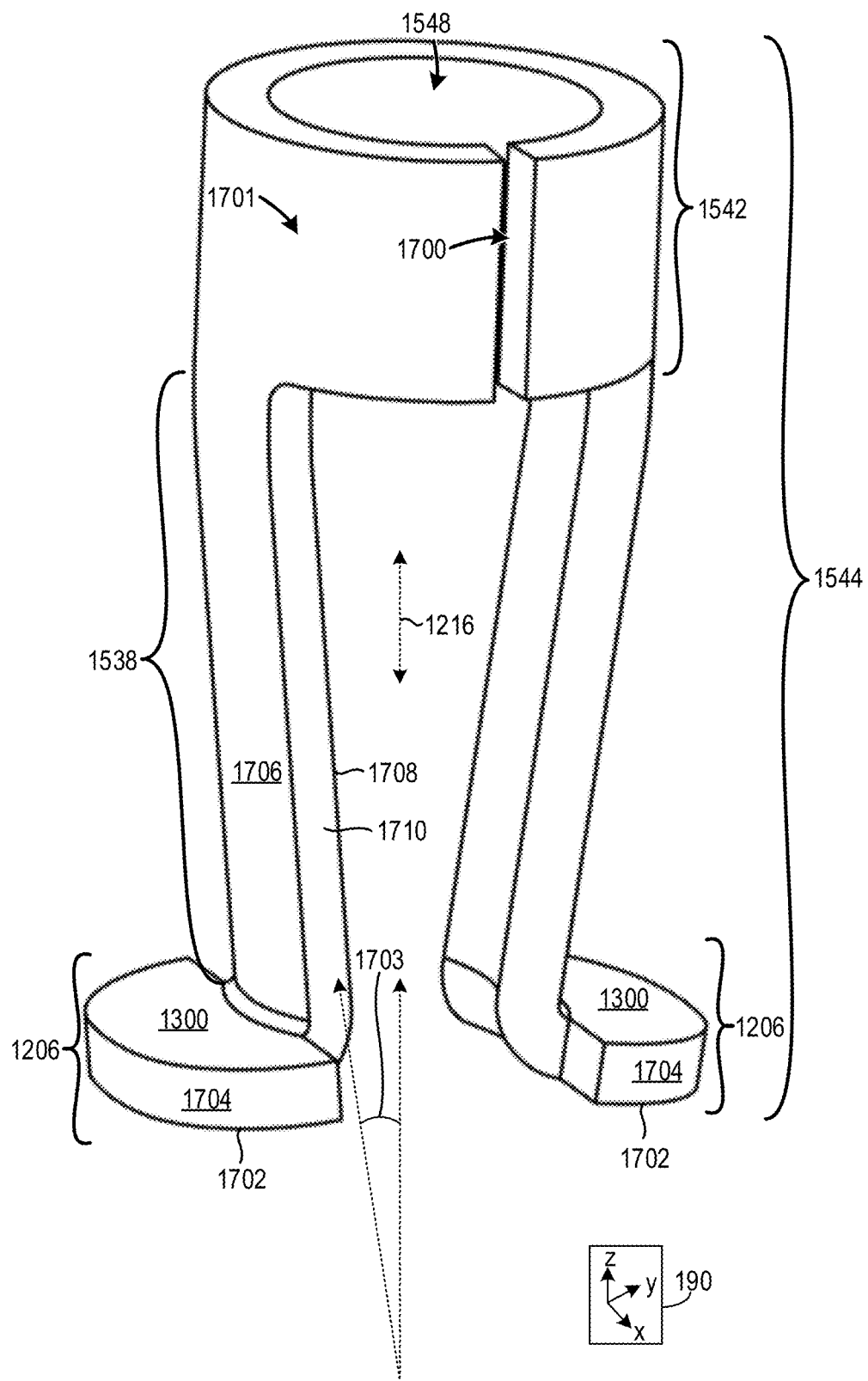
FIG. 17 shows a detailed view of the collet body included in the fastener, shown in FIG. 12.

FIG. 17 shows a detailed view of the collet body 1544 with the flexible legs 1538 having feet 1206 at one end and the crown 1542 at the other end. The collet body 1544 is in a neutral configuration where the legs 1538 are bent inward toward the central axis 1216. Thus, the legs form an angle 1703 with the central axis 1216. Therefore, the legs are not parallel to the central axis in their neutral configuration. The legs will return to the neutral configuration when the stud is moved away from the collet feet, subsequent to leg expansion.

The crown opening 1548 is sized to allow the stud 1234, shown in FIG. 16, to extend there through. The crown 1542 also includes a slit 1700 that extends through the crown wall to allow the diameter of the crown to be reduced when fitting the collet in the sleeve, if desired. The slit 1700 is axially aligned in the illustration. However, other slit orientations may be used in alternate embodiments. When disregarding the slit, the crown has a substantially cylindrical outer profile. However, in other examples, the crown may taper in an upward or downward direction. In this respect, the crown is shaped to enable the collet to be mated with the sleeve 1204, shown in FIG. 16. Thus, it will be appreciated that an outer surface 1701 of the crown 1542 may be adjacent to an interior surface of the sleeve.

The lower clamping surfaces 1300 of the feet 1206 are shown in FIG. 17. The feet 1206 also include surfaces 1702 opposing the clamping surfaces 1300 and a side surface 1704 extending between the surfaces 1300 and the surfaces 1702. The surfaces 1300 and 1702 are parallel to one another and are planar, in the illustrated example. However, other surfaces contours, arrangements, etc., have been envisioned. For example, the surface 1300 and/or the surface 1702 may be curved (e.g., convex, concave, etc.) The side surface 1704 is curved, as depicted in FIG. 17. However, side surfaces with other shapes such as faceted shapes may be used, in other examples.

The flexible legs 1538 are shown including a substantially constant thickness along their length, but tapered leg shapes may be used, in other instances. The shape of the legs may be chosen to achieve a desired amount of leg flexion. The material construction of the legs may inform leg profile. The legs 1538 each include an outer surface 1706, an inner surface 1708 opposing the outer surface, and side surfaces 1710.

Figure 18:
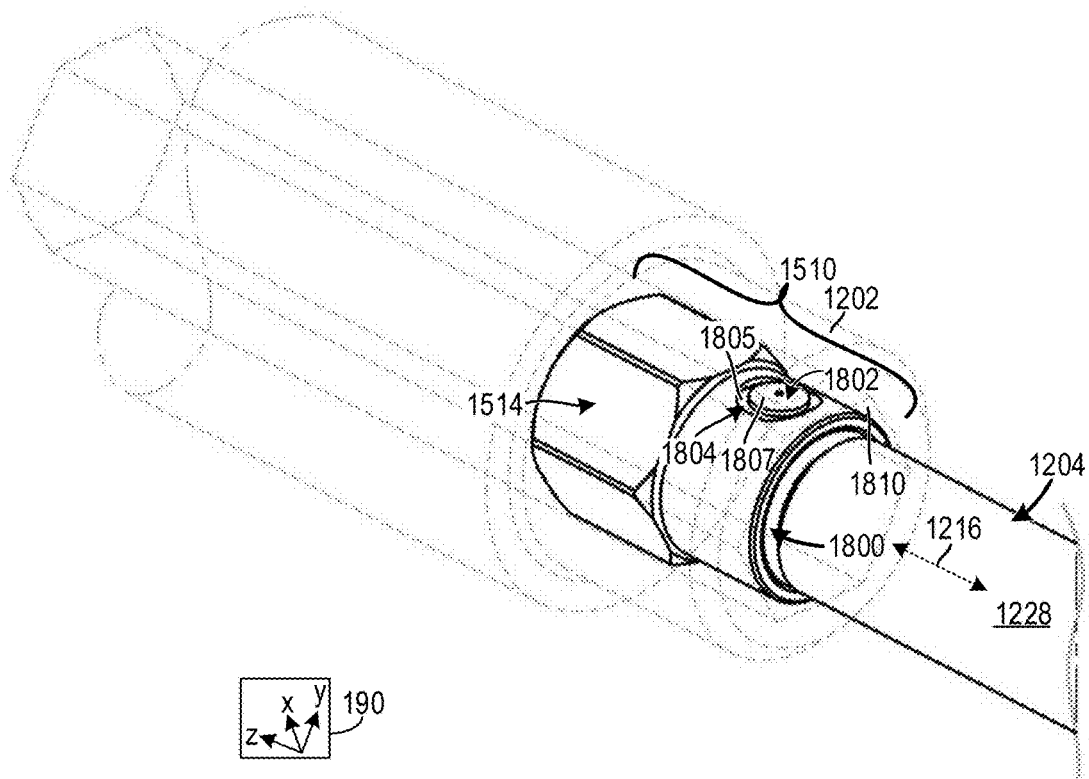
FIGS. 18-19 show detailed views of a threaded interface in the sleeve included in the fastener, shown in FIG. 12.

FIG. 18 depicts, in detail, an example of an interface 1800 between threaded section 1518, shown in FIG. 15, of the shank 1228 and threaded section 1520, illustrated in FIG. 15, of the upper unit 1510 in the sleeve 1204. Pins 1802 may extend through openings 1804 in the upper unit 1510 and the shank 1228. Specifically, in one example, the pins 1802 may be slip fit in the openings 1804. However, other attachment techniques may be used, in other examples. It will be understood that the threaded interface 1800 reacts axial loading and the pins 1802 react torque. Thus, the pins 1802 substantially prevent unwanted rotation between the shank and upper unit while the fastener is transitioned from the engaged configuration to the disengaged configuration or vice versa. As shown, a head 1807 of the pin 1802 fits in a spot face 1805 of the upper unit 1510. However, the pins may extend radially beyond an outer surface of the upper unit, in other embodiments.

One of the pins and openings is hidden from view in FIG. 18. Nevertheless, the pins are separated by 180° about the central axis 1216. However, asymmetric pin arrangements may be used, in other examples. The pins 1802 have a cylindrical shape in FIG. 18 but may be tapered (e.g., conical), in alternate embodiments. Additionally, the fastener includes a pair of pins, in the depicted example. However, in other instances, a single pin may extend through the interface or more than two pins may extend through the interface. The pins 1802 may be axially delimited by an interior surface 1810 of the enclosure 1202 and an exterior surface 1900 of the stud 1234, shown in FIG. 19. FIG. 18 illustrates the anti-rotation section 1514 of the upper unit 1510. It will be understood, that the pins and threaded interfaces may be omitted from the fastener, in other examples. For instance, as previously discussed, the anti-rotation feature (e.g., a polygonal cross-section, splines, etc.) may be directly machined or otherwise constructed with the stud.

Figure 19:
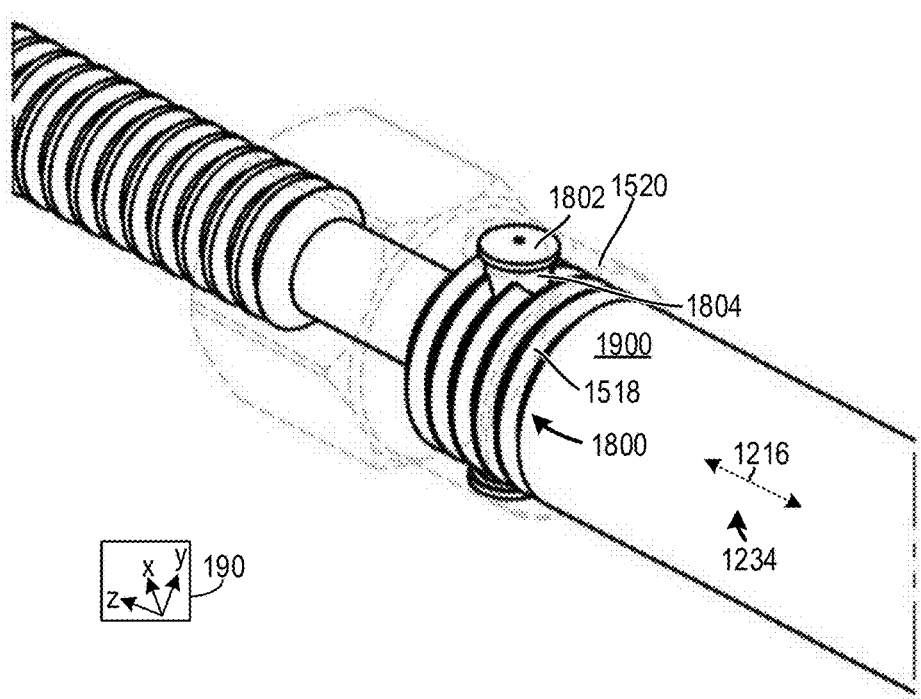

FIG. 19 shows a partially see-through view of the interface 1800 to reveal underlying component interactions. As shown, the pins 1802 extend (e.g., radially extend) through openings 1804 in the threaded sections (1518 and 1520) in the interface 1800, reacting torque, thereby decreasing the chance (e.g., preventing) of the shank and the upper unit unthreading. Consequently, the fastener's reliability is further increased.

Figure 20:
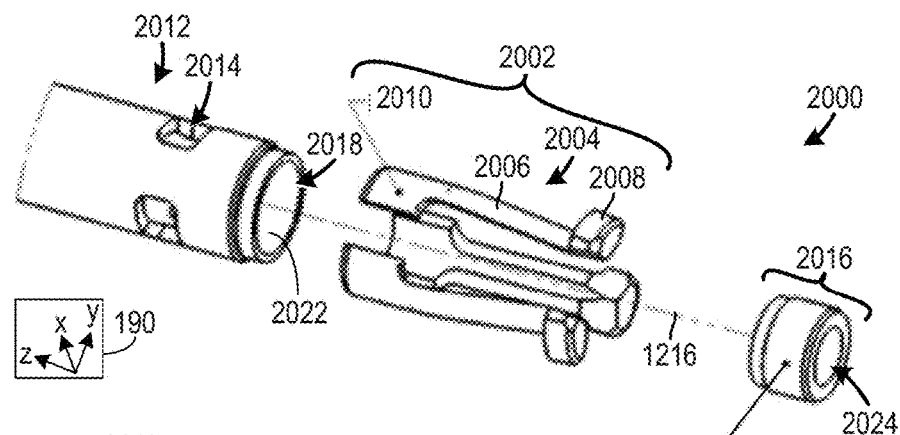
FIGS. 20-22 show different views of a second example of a fastener with discrete clamping legs.
Figure 21:
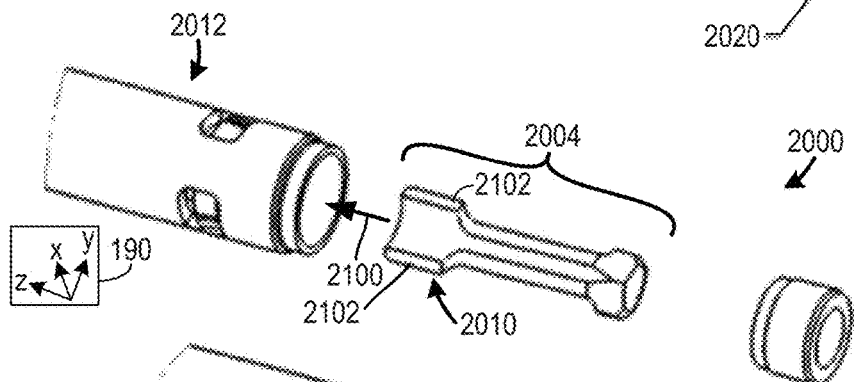
Figure 22:
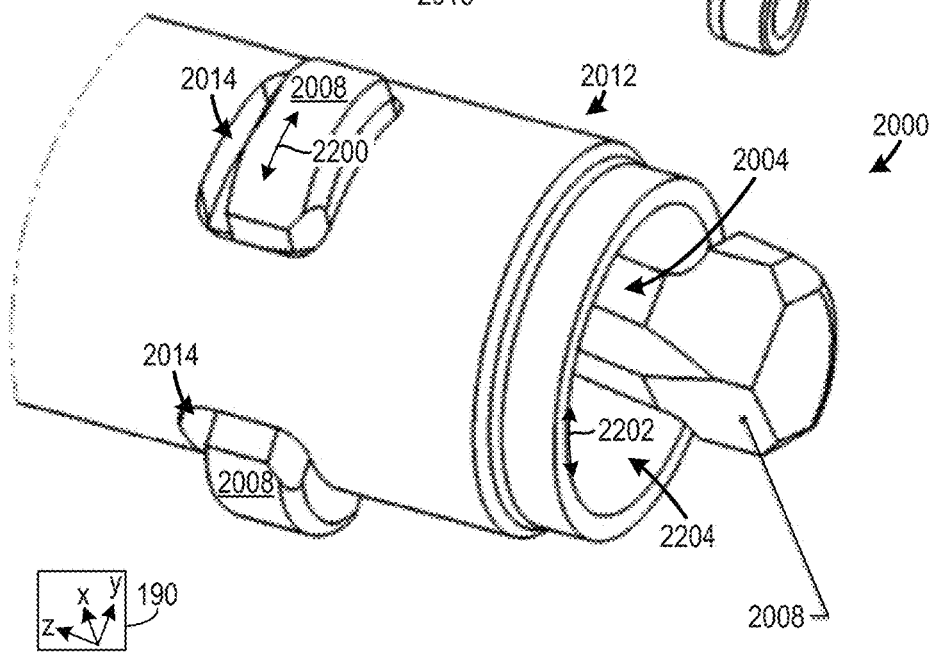

FIGS. 20-22 show another example of a fastener 2000. Fasteners with combinations of structural features, functional features, etc., from the fastener 2000 shown in FIGS. 20-22 with the fastener 1200 shown in FIGS. 12-19 have been envisioned. For example, the fastener 2000 may include an enclosure, a stud, etc. In another example, the fastener 1200 shown in FIGS. 12-19 may include a collet body with discrete leg sections. Therefore, redundant description is omitted for brevity.

FIG. 20 specifically shows a collet 2002 with discrete leg units 2004. The assembly specifically includes three leg units. However, fasteners with two leg units or more than three leg units may be used, in other examples. In alternate examples, however, the collet may be formed as a unitary member with legs which extend from a crown.

Each of the discrete leg units 2004 include a flexible leg 2006 and a clamping foot 2008 at one end. However, a crown section 2010 resides at the other end of the flexible leg and is not coupled to the other leg units. In this way, the leg units may be separately manipulated during fastener assembly, to allow legs with larger feet to be inserted into a sleeve 2012 and enables the feet 2008 to mate with openings 2014 in the sleeve. The fastener 2000 may include other components such as an enclosure axially retaining sections of the sleeve, a stud facilitating radial expansion and retraction of the discrete leg units 2004, and the like.

The fastener 2000 may optionally include a support bushing 2016. When the fastener is assembled, the support bushing 2016 may be placed below the leg units 2004 with regard to the axis 1216. Specifically, in one example, the support bushing 2016 may be press fit, brazed, pinned, swaged, etc., into a lower aperture 2018 in the sleeve 2012 during fastener assembly. Thus, the bushing may be positioned within an interior section of the sleeve axially below the plurality of sleeve openings. The support bushing 2016 reinforces the sleeve to reduce the chance of (e.g., substantially prevent) sleeve deformation (e.g., radial sleeve deformation) during high clamping loads. Limiting sleeve deformation, in turn, limits a reduction in foot support brought about by sleeve deformation.

The support bushing 2016 includes an outer surface 2020 sized and shaped to mate with an interior surface 2022 of the sleeve 2012. The support bushing 2016 also includes a central opening 2024 sized to allow the stud to pass there through when the fastener's grip is decreased. To elaborate, the support bushing 2016 may provide an out of plane buckling support for a shank of the sleeve 2012. For instance, under relatively high loads the sleeve shank may deform (e.g., deform in a triangle shape) and the feet 2008 may correspondingly loose some support. As such, the support bushing 2016 is designed to diminish the loss in foot reinforcement. In alternate examples, the bushing 2016 may be omitted from the fastener. Alternatively, a distal end of the screw may be formed to engage with at least one end of the collet legs (or a solid collet ring having multiple leg protrusions or a solid collet ring having a slit and multiple leg protrusions) to prevent the legs from radially contracting. The fastener shown in FIG. 14 may be designed with a screw having the aforementioned characteristics. Further, in an alternate example, the slot width may be controlled between the desired leg elements so that when assembled, each ring element relies on the other ring elements to hold the combined radial disposition at a desired level.

FIG. 21 shows a stage in assembly of the fastener 2000 where one of the discrete leg units 2004 is inserted into the sleeve 2012, indicated via arrow 2100. Individually inserting the leg units 2004 into the sleeve 2012, allows the size of the clamping feet to be increased, if desired, providing more dispersed workpiece clamping loads to increase clamping resiliency. The reliability of the fastener 2000 is therefore increased. Side surfaces 2102 of the crown section 2010 are shown in FIG. 21. The side surfaces 2102 are parallel to each other in FIG. 21, allowing the collet crown to be packaged in the sleeve. However, other side surface contours may be utilized, in other instances.

FIG. 21 specifically shows the discrete leg unit 2004 inserted into the sleeve 2012 crown first. However, in other embodiments the discrete leg unit may be inserted into the sleeve foot first with the remaining portion of the leg unit pointing toward the distal end of the fastener. The leg units in the collet body may be inserted feet first into the sleeve when they are formed as a continuous structure, such as the collet body 1544, shown in FIG. 17.

FIG. 22 illustrates a detailed view of the fastener 2000 in which two of the discrete leg units 2004 have been placed within the sleeve 2012 and the third leg unit is in the process of sleeve insertion. Specifically, the feet 2008 of two of the leg units are mated with the openings 2014 in the sleeve 2012.

Additionally, in one example, a combined outer circumference 2200 of each of the feet 2008 when held center to center may be larger than an inner circumference 2202 of an inner opening 2204 in the sleeve 2012. Thus, the feet have an increased combined circumference when compared to previous fasteners with the circumference of the feet limited by the circumference of the inner opening of the sleeve. Again the benefits gained by constructing the legs as separate units is an increase in the size of the clamping feet, if desired. Increasing foot size increases the structural integrity of the feet and enables clamping forces to spread out over a greater workpiece surface area, thereby decreasing the likelihood of the fastener moving during clamping and/or damaging the workpiece. It will be understood, that there may be tradeoffs when designing a collet with discrete legs as opposed to a collet unit formed as a continuous shape. For example, the structural integrity of the collet body may be decreased when the legs are separately formed as discrete units.

In the fastener 2000, illustrated in FIGS. 20-22, the discrete leg units 2004 are formed (e.g., machined, cast, etc.) with the feet 2008, at the ends of the units, for example. Additionally, in one example, each discrete leg unit may be formed in a bent (e.g., installed) condition. Once installed, the feet of the discrete leg units partially extend into the openings 2014 in the sleeve 2012. Specifically, in some examples, the feet may not extend beyond the outer diameter of the sleeve 2012. Additionally, in some embodiments, a stud in the fastener may be shaped with a distal section (e.g., reduced diameter section) that is positioned between the crowns of the discrete leg units 2004 after the feet of the leg units are mated with the sleeve opening.

Positioning a portion of the stud between the crowns of the legs inhibits egress of the feet from the sleeve openings. However, in such a configuration (e.g., a disengaged configuration) the stud does not axially expand the legs and the feet still may remain partially mated with the sleeve openings and do not substantially extend beyond the sleeve's outer diameter. During fastener clamp-up, the stud is rotated and the sleeve may be free to axially translate without rotation within the sleeve. Rotation of the stud causes axial motion of the sleeve with respect to the stud. Rotating the stud in this manner, draws the sleeve with the feet mated with the sleeve openings upwards toward the head of the stud. In doing so, the legs and feet, still positioned in the sleeve openings, travel past the reduced diameter section of the lower stud and onto a larger diameter section of the stud.

Movement of the stud to position the larger diameter section adjacent to the feet of the legs transitions the legs from a disengaged position to an engaged position. In the engaged position the feet extend beyond the outer diameter of the sleeve. Reversing the direction of stud rotation reverses axial movement of the sleeve and therefore allows the sleeve and the feet to travel over and eventually stop at the reduced diameter section of the stud. In this way, the feet in the legs are allowed to return to the disengaged position. In the disengaged position the feet may not extend beyond the outer diameter of the sleeve. In one example, the legs and feet may be manufactured using a memory material (e.g., a flexible material designed to return to a predetermined position). However, in other examples, the legs may be designed out of a non-memory material and therefore once installed may not return to a disengaged position.

Figure 23:
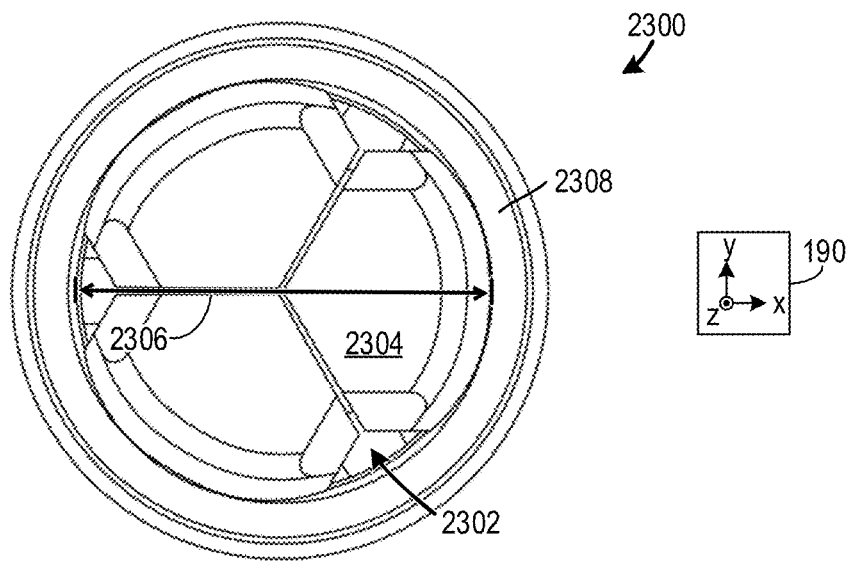
FIG. 23 shows a bottom view of a prior art fastener.

FIG. 23 shows a prior art fastener 2300 where a collet 2302 with a one-piece construction is utilized. As shown, the overall diameter of the collet feet 2304 is limited by the inner diameter 2306 of the sleeve 2308. It will be appreciated that when the collet is constructed as one-piece, packaging issues may arise. To elaborate, the size of the clamping feet in the collet may be reduced or the bore diameter of the sleeve may be increased to avoid mechanical interference between the feet which may inhibit collet insertion into the sleeve. Decreasing clamping foot size, decreases the fastener's clamping area, thereby increasing the chance of workpiece damage which may be particularly undesirable in the aerospace industry. Increasing the sleeve's bore diameter weakens the sleeve which may precipitate a decrease in the fastener's clamping loads. In both case, the fastener's applicability may be diminished.

Figure 29:
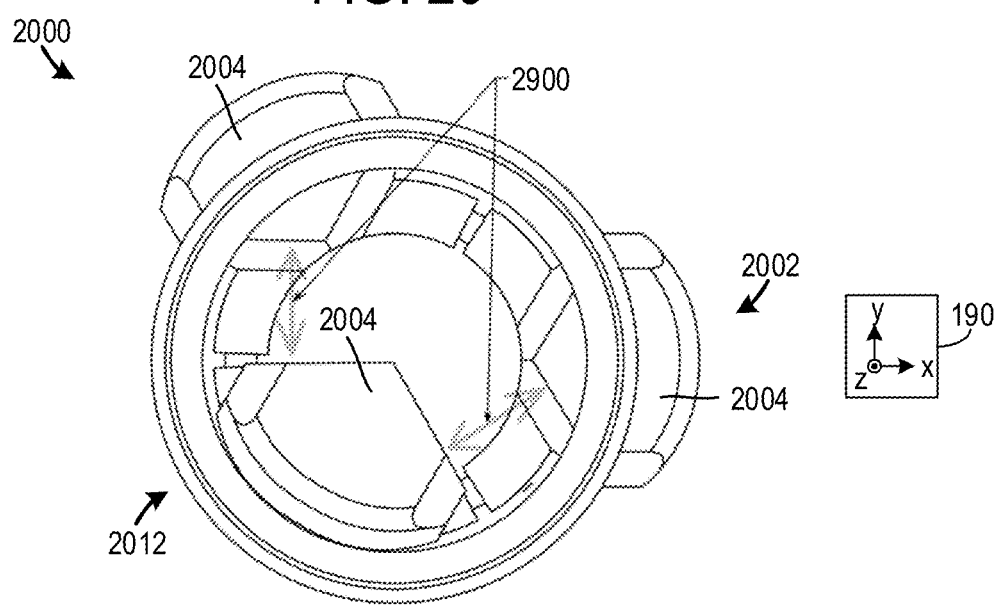
FIG. 29 shows a bottom view of the fastener, shown in FIG. 20, in a partially assembled state.

FIG. 29 shows the fastener 2000 having a collet 2002 with discrete leg units 2004, where each of the leg units is sequential inserted into the sleeve 2012. Sequentially inserting the leg units into the sleeve one at a time enables significant clearance 2900 to be achieved. The increased clearance may allow the size of the clamping feet to be increased and/or the internal bore diameter of the sleeve to be reduced to increase sleeve strength, if desired. In either case, the fastener may achieve increased clamping loads, thereby increasing the fastener's applicability and customer appeal.

It will be understood that the relative size of the clamping feet in the fastener 2000, shown in FIGS. 20-22, with regard to the sleeve may be larger than the relative size of the feet 2008 with regard to the sleeve 2012. As such, the fastener 2000, shown in FIGS. 20-22, can leverage the benefits of increased clamping surface area, unachievable by prior fasteners. The larger feet size can be achieved by designing the collet with discrete legs each having a clamping foot. Additionally or alternatively, the bore diameter of the sleeve 2012, shown in FIGS. 20-22 may be decreased to strengthen the fastener.

FIGS. 24-27 show an example of a manufacturing sequence for a sleeve 2400 that may be included in the fastener 1200 depicted in FIGS. 12-19. Thus, the sleeve 2400 is an example of the sleeve 1204, shown in FIGS. 12-19. However, other suitable sleeves may be included in the fastener shown in FIGS. 12-19.

Figure 24:
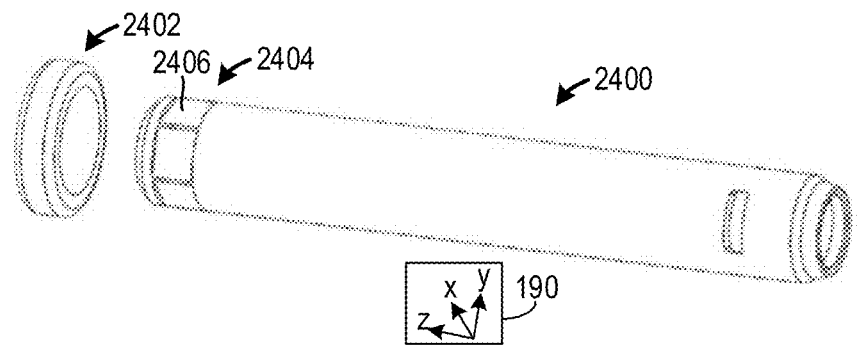
FIGS. 24-27 show an example of a manufacturing sequence of a sleeve in a fastener.

FIG. 24 specifically illustrates a ring 2402 and a shank 2404 with a gripping surface 2406. The gripping surface 2406 has a polygonal shape (e.g., hexagonal shape, octagonal shape, square shape, etc.) in the illustrated example. However, other gripping surface profiles have been envisioned. Further, in other examples, the gripping surface may include splines that provide an anti-rotation functionality when the sleeve is mated with the enclosure. Further, the enclosure may have a correspondingly shaped anti-rotation feature.

Figure 25:
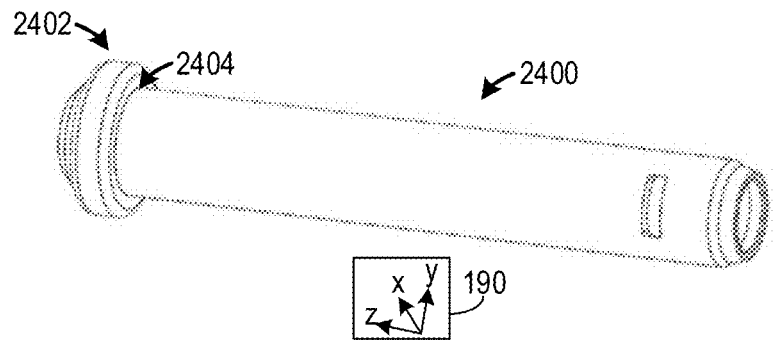
Figure 26:
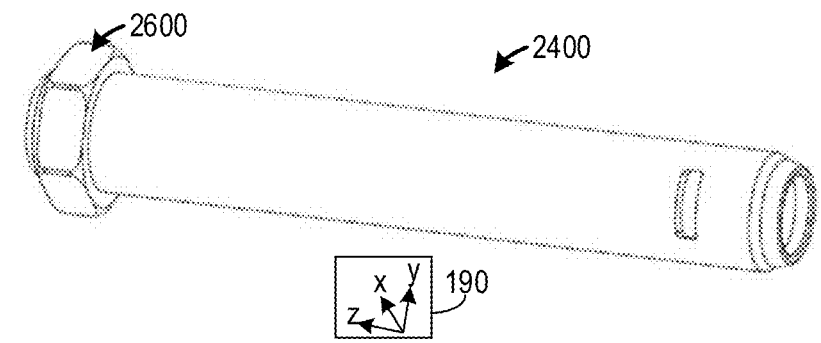

FIG. 25 shows the ring 2402 slid over the shank 2404. Next in FIG. 26 the ring 2402 is mechanically swaged (e.g., swaged with dies) or otherwise tooled to form an outer anti-rotation section 2600 having a polygonal shape, in the illustrated example.

Figure 27:
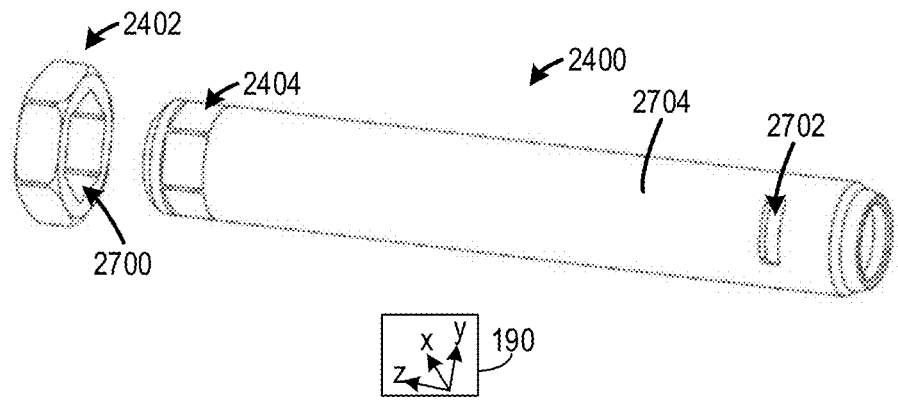

FIG. 27 shows the ring 2402 separated from the sleeve 2400 to reveal the polygonal surface 2700 which has been shaped to conform to the shape of the shank 2404. In this way, the anti-rotation section may be efficiently joined with the sleeve 2400. However, other suitable manufacturing techniques for the anti-rotation section have been envisioned. As such, in an alternate example, the anti-rotation section of the sleeve may be machined directly into the sleeve, welded onto the sleeve, combinations thereof, etc. It will be understood that the anti-rotation section may mate with an anti-rotation section in the enclosure, such as enclosure 1202, shown in FIGS. 12-16, to allow the sleeve to axially translate upward and downward while substantially preventing rotation between the sleeve and enclosure. Openings 2702 and the outer surface 2704 in the sleeve 2400 are again depicted.

FIGS. 1-10, 12-22, 24-27, and 29 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 28:
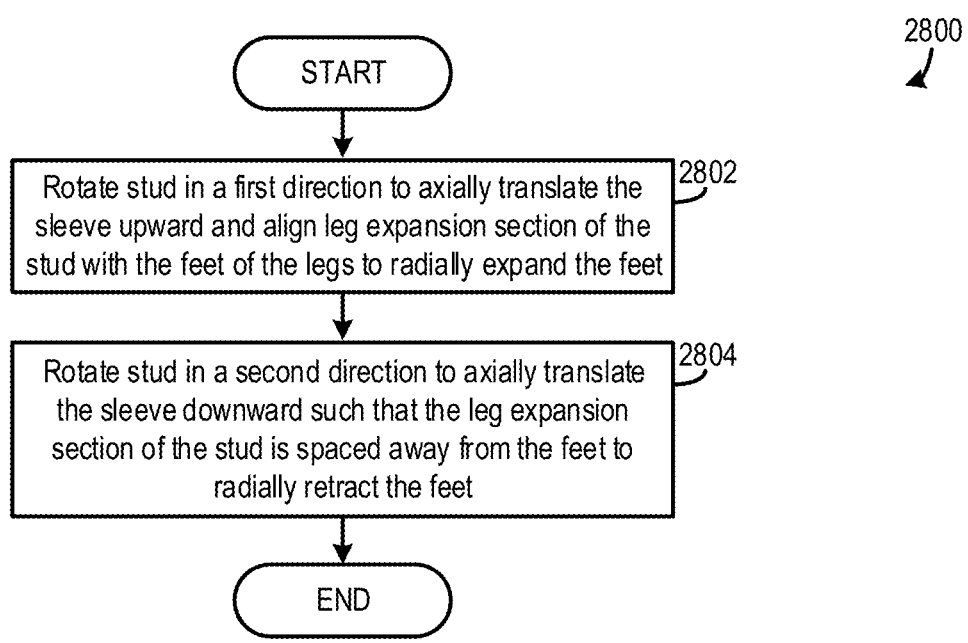
FIG. 28 shows a method for engaging and disengaging clamping feet in a fastener.

FIG. 28 shows a method 2800 for operating a fastener. The method may be implemented by any of the fasteners or combinations of the fasteners described above with regard to FIGS. 12-22, 24-27, and 29. However, in other examples, the method may be implemented by other suitable fasteners. It will be appreciated that the method 2800 may be at least implemented in part via an automated process. As such, the method steps may be stored as instructions in non-transitory memory that when executed by the processor cause a controller to implement the method steps. It will be understood that the memory and processor may be included in hardware of a tooling apparatus. It will also be appreciated that the automated tooling apparatus may further include tooling attachments, arms, carriages, drivers, etc., for manipulating the fastener. However, at least some of the steps, in some examples, may be implemented via manufacturing personnel manually operating tooling apparatuses.

At 2802, the method includes rotating the stud in a first direction to axially translate the sleeve upward and align the leg expansion section of the stud with the collet feet to radially expand the feet. As previously discussed, the stud's leg expansion section spreads the feet in the collet prior to expanding of lower leg sections in the collet. Step 2802 transitions the fastener from the disengaged configuration to the engaged configuration.

Next at 2804, the method includes rotating stud in a second direction, opposing the first direction, to axially translate the sleeve downward such that the leg expansion section of the stud is spaced away from the feet to radially retract the feet. Step 2804 transitions the fastener from the engaged configuration to the disengaged configuration.

The technical effect of providing a fastener assembly with a protective sleeve at least partially circumferentially surrounding a clamping unit and a splitter bar is to increase fastener longevity and durability by protecting the clamping unit from abrasive wear during tooling as well as offloading some shear stresses experienced during workpiece clamping from the clamping unit to the sleeve.

The technical effect of providing a fastener with a collet body having clamping feet mating with openings in a sleeve and extending from a crown located axially below the clamping feet is to increase the fastener's reliability by circumventing a fastener mode of operation where the collet feet remain bent inward while the stud pushes portions of the legs outward.

The invention will further be described in the following paragraphs. In one aspect, a fastener assembly is provided that comprises a clamping unit including two clamping legs each having a shank and a clamping foot extending therefrom; a splitter bar including two extensions and a shaft extending between the two clamping legs and radially expanding and retracting the clamping feet responsive to axially translation of the clamping unit; and a protective sleeve partially circumferentially surrounding at least a portion of the clamping leg shanks and the splitter bar, the protective sleeve comprising two slots having the two extensions extending there through.

In another aspect, a method for operating a fastener assembly is provided that comprises inserting the fastener assembly into a plurality of workpieces, where a protective sleeve is adjacent to apertures in the plurality of workpieces during at least a portion of the insertion; and transitioning the fastener assembly from an unclamped configuration where a plurality of clamping feet in a plurality of clamping legs of a clamping unit radially extend inwardly to a clamping configuration where the plurality of clamping legs is pushed outward via a splitter bar and where the plurality of clamping feet contact a lower clamping surface in the plurality of workpieces; where the protective sleeve at least partially encloses the splitter bar and the clamping unit and includes two slots having two extensions in the splitter bar extending there through. In one example, the method may further comprise transitioning the fastener assembly from the clamping configuration to the unclamped configuration and removing the fastener assembly from the plurality of workpieces.

In yet another aspect, a removable fastener assembly is provided that comprises a clamping unit including two clamping legs each having a shank and a clamping foot extending therefrom; a splitter bar including two extensions and a shaft extending between the two clamping legs and radially expanding and retracting the clamping feet responsive to axially translation of the clamping unit; a protective sleeve partially circumferentially surrounding at least a portion of the clamping leg shanks and the splitter bar; where the protective sleeve comprises two slots having the two extensions extending there through; and a body including an upper clamping surface and at least partially enclosing the clamping unit, the splitter bar, and the protective sleeve, where the clamping feet each include a lower clamping surface.

In any of the aspects or combinations of the aspects, the protective sleeve may include a first reinforcement section forming an upper end wall of each of the two slots and a second reinforcement section forming a lower end wall of each of the two slots.

In any of the aspects or combinations of the aspects, the protective sleeve may include a reinforcement section extending across an upper or lower end of each of the two slots.

In any of the aspects or combinations of the aspects, the fastener assembly may further comprise a body including an upper clamping surface and at least partially enclosing the clamping unit, the splitter bar, and the protective sleeve, where the clamping feet each include a lower clamping surface.

In any of the aspects or combinations of the aspects, the body may include a lip axially retaining portions of the protective sleeve, the splitter bar, and the clamping unit in an interior cavity of the body.

In any of the aspects or combinations of the aspects, an axial length of the splitter bar may be less than an axial length of the two slots of the protective sleeve.

In any of the aspects or combinations of the aspects, the protective sleeve may include a flange radially extending from an upper end of the protective sleeve.

In any of the aspects or combinations of the aspects, the flange may be designed to contact a spring positioned in a body.

In any of the aspects or combinations of the aspects, a nut cage of the clamping unit may axially interact with a drive mechanism coupled to an upper end of a body during fastener clamping and unclamping.

In any of the aspects or combinations of the aspects, in a clamping configuration the splitter bar may extend between the clamping feet and may radially expand the clamping feet; and where in an unclamped configuration a lower end of the splitter bar may be axially offset from the clamping feet.

In any of the aspects or combinations of the aspects, in the clamping configuration, clamping surfaces in the clamping feet may be in contact with a workpiece and extend radially beyond an outer surface of the protective sleeve.

In any of the aspects or combinations of the aspects, in the unclamped configuration, the clamping feet may contact one another.

In any of the aspects or combinations of the aspects, the fastener assembly may further comprise a drive mechanism including a stud threading into a section of a body.

In any of the aspects or combinations of the aspects, during the transition between the unclamped configuration and a clamped configuration, the protective sleeve may axially translate towards an upper end of the fastener assembly when the clamping unit axially translates towards the upper end of the fastener assembly.

In any of the aspects or combinations of the aspects, during the transition between the unclamped configuration and a clamped configuration, the slots may axial translate with regard to the two extensions in the splitter bar.

In any of the aspects or combinations of the aspects, the leg shanks may extend radially inward with regard to a central axis of the removable fastener assembly in an unclamped configuration and where in the unclamped configuration, the clamping feet do not extend radially beyond an outer surface of the protective sleeve.

In one aspect, a fastener is provided that comprises: a sleeve including an interior threaded section and a sleeve opening with a periphery forming a closed shape; a collet body at least partially enclosed within the sleeve, the collet body comprising: a crown; and a flexible leg extending from the crown and including a foot mating with the sleeve opening, where the sleeve opening extends around the foot and where the crown is positioned axially below the sleeve opening; and a stud including a threaded section engaging the interior threaded section.

In another aspect, a fastener is provided that comprises: a sleeve including a plurality of sleeve openings, each of the plurality of sleeve openings include a periphery forming a closed shape; a collet body at least partially enclosed within the sleeve, the collet body comprising: a first discrete leg unit with a first foot; and a second discrete leg unit with a second foot; and a stud including a threaded section engaging an interior threaded section in the sleeve; where in an engaged configuration the first and second discrete leg units are radially expanded by the stud and the first and second foot each extend through a different one of the plurality of sleeve openings.

In yet another aspect, a fastener is provided that comprises: a sleeve including an outer anti-rotation section, an interior threaded section, and a plurality of sleeve openings each having a periphery forming a closed shape; a collet body at least partially enclosed within the sleeve, the collet body comprising: a crown; and a plurality of flexible legs extending from the crown, each of the plurality of flexible legs including a foot mating with a corresponding sleeve opening included in the plurality of sleeve openings, where the corresponding sleeve opening extends around the foot and where the crown is positioned axially below the plurality of sleeve openings; a stud including a threaded section engaging the interior threaded section; and an enclosure comprising an inner anti-rotation section mating with the outer anti-rotation section and an upper clamping surface; where the fastener is designed to operate in an engaged configuration and disengaged configuration, and during a transition from the disengaged configuration to the engaged configuration the feet are radially expanded and in the engaged configuration the feet are radially positioned outward from an outer surface of the sleeve.

In another aspect, a fastener is provided that comprises a sleeve in an enclosure, the sleeve including an interior threaded section and a sleeve opening with a periphery forming a closed shape; a collet body at least partially enclosed within the sleeve, the collet body comprising: a flexible leg including a foot mating with the sleeve opening, where the sleeve opening extends around the foot; and a stud including a threaded section engaging the interior threaded section.

In yet another aspect, a fastener is provided that includes a sleeve including a plurality of sleeve openings, each of the plurality of sleeve openings include a periphery forming a closed shape; a plurality of discrete leg units each including a foot; and a stud including a threaded section engaging an interior threaded section in the sleeve; where in an engaged configuration the plurality of discrete leg units are radially expanded by the stud and the feet each extend through a different one of the plurality of sleeve openings.

In any of the aspects or combinations of the aspects, when the fastener is transitioned from an engaged configuration to a disengaged configuration, a leg expansion section of the stud may initially engage the foot to radially expand the foot outward from a central axis of the fastener.

In any of the aspects or combinations of the aspects, a leg expansion section of the stud may extend between two flexible legs when the fastener is in an engaged configuration, where the flexible leg is included in the two flexible legs.

In any of the aspects or combinations of the aspects, a lower end of the stud may not extend axially below the crown when the fastener is in the engaged configuration.

In any of the aspects or combinations of the aspects, the stud may include a reduced diameter section positioned between the two flexible legs when the fastener is in a disengaged configuration.

In any of the aspects or combinations of the aspects, the sleeve may include a shank threadingly engaged with an upper unit at a threaded interface, the upper unit mated with an interior cavity of an enclosure.

In any of the aspects or combinations of the aspects, the fastener may further comprise a pin extending through the threaded interface.

In any of the aspects or combinations of the aspects, the fastener may be designed to operate in an engaged configuration and a disengaged configuration, and during a transition from the disengaged configuration to the engaged configuration, the foot is radially expanded outward beyond an outer surface of a housing of the sleeve.

In any of the aspects or combinations of the aspects, when the fastener is in a disengaged configuration, the foot may not extend radially beyond an outer surface of the sleeve.

In any of the aspects or combinations of the aspects, the crown of the collet body may include a slit extending there through.

In any of the aspects or combinations of the aspects, the first and second discrete leg units may each include a body axially extending below the plurality of sleeve openings.

In any of the aspects or combinations of the aspects, a radius of each foot may be greater than a radius of a lower sleeve aperture.

In any of the aspects or combinations of the aspects, the fastener may further comprise a foot support bushing positioned within an interior section of the sleeve axially below the first and second foot and supporting a housing of the sleeve.

In any of the aspects or combinations of the aspects, the stud may include a reduced diameter section axially aligned with the flexible leg when the fastener is in a disengaged configuration.

In any of the aspects or combinations of the aspects, a leg expansion section of the stud may extend between the plurality of flexible legs when the fastener is in the engaged configuration and where the stud may include a reduced diameter section positioned between the plurality of flexible legs when the fastener is in a disengaged configuration.

In any of the aspects or combinations of the aspects, the crown may circumferentially enclose by a section of the sleeve positioned axially below the plurality of sleeve openings.

In any of the aspects or combinations of the aspects, the sleeve may include a shank threadingly engaged with an upper unit including the outer anti-rotation section at a threaded interface.

In any of the aspects or combinations of the aspects, the fastener may be designed to operate in an engaged configuration and disengaged configuration, and during a transition from the disengaged configuration to the engaged configuration the feet are contacted by a leg expansion section of the stud prior to contact between the leg expansion section and the plurality of flexible legs.

In any of the aspects or combinations of the aspects, a combined outer circumference of each of the feet when held center to center may be larger than an inner circumference of an inner hole in the sleeve.

In any of the aspects or combinations of the aspects, when the fastener is transitioned from a disengaged configuration to an engaged configuration, a leg expansion section of the stud may engage the flexible leg and/or the foot to radially expand the foot outward from a central axis of the fastener beyond an outer surface of a housing of the sleeve.

In any of the aspects or combinations of the aspects, a leg expansion section of the stud may interact with the flexible leg to retain radial expansion of the foot in an engaged configuration.

In any of the aspects or combinations of the aspects, the stud may include a reduced diameter section that is smaller in diameter than the leg expansion section and is adjacent to a flexible leg in a disengaged configuration.

In any of the aspects or combinations of the aspects, the threaded section may extend to a distal end of the stud.

In any of the aspects or combinations of the aspects, the leg expansion section may maintain a crown of the collet body and/or a top part of the flexible leg located radially.

In any of the aspects or combinations of the aspects, the sleeve may include a plurality of exterior surfaces mated with an interior cavity of an enclosure and provides translation without rotation.

In any of the aspects or combinations of the aspects, the sleeve may include a hex, spline, or other external feature that cooperates with an internal anti-rotation feature of the collet body.

In any of the aspects or combinations of the aspects, the fastener may further comprise a bushing positioned within an interior section of the sleeve axially below the plurality of sleeve openings.

In any of the aspects or combinations of the aspects, the leg expansion section may maintain a crown of the collet body and/or a top part of the flexible leg located radially and/or where the stud may include a reduced diameter section that is smaller in diameter than the leg expansion section and extends between the plurality of flexible legs in a disengaged configuration.

In another representation, a fastener system is provided that comprises a collet body with a plurality of flexible legs extending axially upward from a crown, where each of the plurality of flexible legs includes clamping feet mated with a plurality of openings in a sleeve, and a stud threadingly engaging an interior threaded section of the sleeve and including a reduced diameter section at an end of the stud spaced away from the head and positioned between the clamping feet when the fastener system is in a disengaged configuration.

In another representation, a removable fastener is provided that includes a body housing an assembly including a protective sleeve, clamping unit, and splitter bar, where the protective sleeve at least partially circumferentially surrounds a portion of the clamping unit and the splitter bar and where the protective sleeve and the clamping unit axial translate upward and downward during transition between a clamping configuration and an unclamping configuration while the splitter bar remains substantially stationary.

Note that the example control and estimation routines included herein can be used with various fastener assembly configurations. The control methods and routines disclosed herein may be stored as executable instructions in non-transitory memory and may be carried out by a tooling apparatus.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the fastener assembly and/or tooling apparatus, where the described actions are carried out by executing the instructions in a tooling apparatus and fastener assembly including the various components.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, the automotive industry, industrial manufacturing, etc. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastener, comprising:
   a sleeve including an interior threaded section that is arranged within an inner bore of an enclosure, the sleeve including a sleeve opening with a periphery forming a closed shape;
   a collet body at least partially enclosed within the sleeve, the collet body comprising:
      a flexible leg including a foot mating with the sleeve opening, where the sleeve opening extends around the foot; and
   a stud including a threaded section engaging the interior threaded section;
   where the inner bore has a polygonal cross-section and the sleeve has a plurality of planar faces arranged in a polygonal shape;
   where the plurality of planar faces in the sleeve form a closed shape that does not include any curved surfaces;
   where the inner bore and the plurality of planar faces in the sleeve interact to prevent rotation of the sleeve;
   where the stud threadingly engages the interior threaded section of the sleeve;
   where an outer diameter of the sleeve is less than a diameter of the inner bore of the enclosure;
   where a portion of the sleeve that includes the sleeve opening is positioned below the enclosure; and
   where a shank of the sleeve has a constant outer diameter that mates with apertures in an upper workpiece and a lower workpiece and where the apertures have equivalent diameters.

2. The fastener of claim 1, where when the fastener is transitioned from a disengaged configuration to an engaged configuration, a leg expansion section of the stud engages the flexible leg and/or the foot to radially expand the foot outward from a central axis of the fastener beyond an outer surface of a housing of the sleeve.

3. The fastener of claim 1, where a leg expansion section of the stud interacts with the flexible leg to retain radial expansion of the foot in an engaged configuration.

4. The fastener of claim 3, where the stud includes a reduced diameter section that is smaller in diameter than the leg expansion section and is adjacent to the flexible leg in a disengaged configuration.

5. The fastener of claim 1, further comprising a retaining ring position in a recess of the enclosure.

6. The fastener of claim 3, where the leg expansion section maintains a crown of the collet body and/or a top part of the flexible leg located radially.

7. The fastener of claim 1, where the polygonal shape is a hexagonal shape, an octagonal shape, or a square shape.

8. The fastener of claim 1, where when the fastener is in a disengaged configuration, the foot does not substantially extend radially beyond an outer surface of the sleeve.

9. The fastener of claim 1, where a crown of the collet body includes a slit extending there through.

10. A fastener, comprising:
a sleeve including an interior threaded section and a plurality of sleeve openings each having a periphery forming a closed shape;
a collet body at least partially enclosed within the sleeve, the collet body comprising:
a crown; and
a plurality of flexible legs extending from the crown, each of the plurality of flexible legs including a foot mating with a corresponding sleeve opening included in the plurality of sleeve openings, where the corresponding sleeve opening extends around the foot and where the crown is positioned axially below the plurality of sleeve openings;
a stud including a threaded section engaging the interior threaded section; and
an enclosure comprising an upper clamping surface;
where the enclosure has an inner bore with polygonal cross-section and the sleeve has a plurality of planar faces arranged in a polygonal shape;
where the plurality of planar faces in the sleeve form a closed shape that does not include any curved surfaces;
where a shank of the sleeve has a constant outer diameter that mates with apertures in an upper workpiece and a lower workpiece and where the apertures have equivalent diameters;
where the fastener is configured to operate in an engaged configuration and disengaged configuration, and during a transition from the disengaged configuration to the engaged configuration the feet are radially expanded and in the engaged configuration the feet are radially positioned outward from an outer surface of the sleeve;
where the inner bore and the plurality of planar faces in the sleeve interact to prevent rotation of the sleeve;
where the plurality of sleeve openings are spaced away from the upper clamping surface;
where the stud threadingly engages the sleeve;
where an outer diameter of the sleeve is less than a diameter of the inner bore of the enclosure; and
where a portion of the sleeve that includes the plurality of sleeve openings is positioned below the enclosure.

11. The fastener of claim 10, where a leg expansion section of the stud extends between the plurality of flexible legs when the fastener is in the engaged configuration and where the stud includes a reduced diameter section positioned between the plurality of flexible legs when the fastener is in the disengaged configuration.

12. The fastener of claim 10, where the crown is circumferentially enclosed by a section of the sleeve positioned axially below the plurality of sleeve openings.

13. The fastener of claim 11, where the leg expansion section maintains the crown of the collet body and/or top parts of the plurality of flexible legs located radially and/or where the stud includes the reduced diameter section that is smaller in diameter than the leg expansion section and extends between the plurality of flexible legs in the disengaged configuration.

14. The fastener of claim 10, where during the transition from the disengaged configuration to the engaged configuration the feet are contacted by a leg expansion section of the stud prior to contact between the leg expansion section and the plurality of flexible legs.

* * * * *